US010902375B2

(12) United States Patent
Wilkinson et al.

(10) Patent No.: US 10,902,375 B2
(45) Date of Patent: Jan. 26, 2021

(54) SYSTEM AND METHOD FOR DELIVERING PACKAGES TO CUSTOMERS

(71) Applicant: Walmart Apollo, LLC, Bentonville, AR (US)

(72) Inventors: Bruce W. Wilkinson, Rogers, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 374 days.

(21) Appl. No.: 15/838,993

(22) Filed: Dec. 12, 2017

(65) Prior Publication Data
US 2018/0165638 A1    Jun. 14, 2018

Related U.S. Application Data

(60) Provisional application No. 62/434,272, filed on Dec. 14, 2016.

(51) Int. Cl.
G06Q 10/08     (2012.01)
G07F 17/12     (2006.01)
(Continued)

(52) U.S. Cl.
CPC ........ *G06Q 10/0836* (2013.01); *G01S 5/0294* (2013.01); *G06F 16/00* (2019.01);
(Continued)

(58) Field of Classification Search
CPC ............. G06Q 10/0836; G06Q 10/083; G06Q 10/0833; G06Q 10/0838; H04W 4/21;
(Continued)

(56) References Cited

U.S. PATENT DOCUMENTS 5,137,208 A    8/1992 Wang
6,240,362 B1    5/2001 Gaspard, II
(Continued)

FOREIGN PATENT DOCUMENTS

CN    103337110    10/2013
GB    2366644    3/2002
(Continued)

OTHER PUBLICATIONS

Keyless Day Lockers and Package Delivery Lockers, 2016, https://www.southwestsolutions.com/divisions/office/parcel-package-delivery-lockers (Year: 2016).*
(Continued)

*Primary Examiner* — Kevin H Flynn
*Assistant Examiner* — Michelle E Carey
(74) *Attorney, Agent, or Firm* — Fitch, Even, Tabin & Flannery LLP

(57) ABSTRACT

In some embodiments, system, apparatuses and methods are provided useful for delivering packages. One such configuration may include storage lockers and a control circuit that detects proximity of delivery agents to a locker, and in response, sends a code to an agent that verifies the agent upon receipt of the code therefrom. In another configuration, the control circuit associates a storage locker with a customer profile, detects a customer approaching and a first authentication aspect, receives a second authentication aspect, and compares the authentication aspects with the customer profile. In another example, a control circuit associates a delivery container with a customer profile and the delivery agents handling the container, and upon receiving a package scan, compares the scan with aspects associated with responsible delivery agents. In another example, a control circuit receives sensed data from a customer and
(Continued)

authenticates delivery by comparing the sensed data with delivery agent profiles.

22 Claims, 12 Drawing Sheets

(51) Int. Cl.

| | | |
|---|---|---|
| A47G 29/12 | (2006.01) | |
| H04W 12/06 | (2009.01) | |
| G01S 5/02 | (2010.01) | |
| H04W 4/21 | (2018.01) | |
| G06F 21/32 | (2013.01) | |
| H04W 4/35 | (2018.01) | |
| G07C 9/00 | (2020.01) | |
| G06F 16/00 | (2019.01) | |
| G06F 21/34 | (2013.01) | |
| G06F 21/62 | (2013.01) | |
| H04W 12/08 | (2009.01) | |

(52) U.S. Cl.
CPC .............. *G06F 21/32* (2013.01); *G06F 21/34* (2013.01); *G06F 21/62* (2013.01); *G06Q 10/083* (2013.01); *G06Q 10/0833* (2013.01); *G06Q 10/0838* (2013.01); *G07C 9/00571* (2013.01); *G07C 9/00896* (2013.01); *G07C 9/00912* (2013.01); *G07F 17/12* (2013.01); *H04W 4/21* (2018.02); *H04W 4/35* (2018.02); *H04W 12/0602* (2019.01); *H04W 12/0608* (2019.01); *H04W 12/0804* (2019.01); *G07C 2009/0092* (2013.01); *G07C 2209/63* (2013.01)

(58) Field of Classification Search
CPC ....... H04W 4/35; H04W 12/06; H04W 12/08; G06F 16/00; G06F 21/32; G06F 21/34; G06F 21/62; G01S 5/0294; G07C 9/00571; G07C 9/00896; G07C 9/00912; G07C 2009/0092; G07C 2209/63; G07F 17/12; G07F 17/13; A47G 29/12
See application file for complete search history.

(56) References Cited

U.S. PATENT DOCUMENTS

| | | | |
|---|---|---|---|
| 6,385,537 B2 | 5/2002 | Gaspard, II | |
| 6,411,897 B1 | 6/2002 | Gaspard, II | |
| 6,806,807 B2 | 10/2004 | Cayne | |
| 6,961,711 B1 | 11/2005 | Chee | |
| 7,113,071 B2 | 9/2006 | Cayne | |
| 7,257,552 B1 | 8/2007 | Franco | |
| 7,840,427 B2 | 11/2010 | O'Sullivan | |
| 7,945,469 B2 | 5/2011 | Cohen | |
| 7,945,470 B1 | 5/2011 | Cohen | |
| 8,160,972 B1 | 4/2012 | Tannenbaum | |
| 8,554,694 B1 | 10/2013 | Ward | |
| 9,066,206 B2 | 6/2015 | Lin | |
| 9,202,191 B2 | 12/2015 | Bowen | |
| 9,230,292 B2 | 1/2016 | Amin | |
| 9,269,103 B1 | 2/2016 | Kumar | |
| 9,305,310 B2 | 4/2016 | Radhakrishnan | |
| 9,378,479 B2 | 6/2016 | Seifen | |
| 9,387,928 B1 | 7/2016 | Gentry | |
| 9,459,622 B2 | 10/2016 | Abhyanker | |
| 9,552,564 B1 | 1/2017 | Martenis | |
| 9,639,908 B1 | 5/2017 | Reiss | |
| 9,718,397 B2 | 8/2017 | Kalanick | |
| 9,721,224 B2 | 8/2017 | Waris | |
| 9,778,057 B2 | 10/2017 | O'Mahony | |
| 9,792,574 B2 | 10/2017 | Lord | |
| 9,805,536 B2 | 10/2017 | Lutnick | |
| 9,811,838 B1 | 11/2017 | Daire | |
| 9,852,551 B2 | 12/2017 | Brinig | |
| 9,902,310 B2 | 2/2018 | Fournier | |
| 9,904,900 B2 | 2/2018 | Cao | |
| 9,928,540 B1 | 3/2018 | Gerard | |
| 9,934,530 B1 | 4/2018 | Iacono | |
| 2002/0156645 A1 | 10/2002 | Hansen | |
| 2003/0040944 A1 | 2/2003 | Hileman | |
| 2003/0046173 A1 | 3/2003 | Benjier | |
| 2003/0121968 A1 | 7/2003 | Miller | |
| 2004/0083371 A1 | 4/2004 | Algazi | |
| 2005/0006470 A1 | 1/2005 | Mrozik | |
| 2005/0068178 A1 | 3/2005 | Lee | |
| 2005/0288977 A1 | 12/2005 | Mayer | |
| 2006/0020489 A1 | 1/2006 | Rivalto | |
| 2006/0026030 A1 | 2/2006 | Jacobs | |
| 2006/0238334 A1 | 10/2006 | Mangan | |
| 2007/0107477 A1 | 5/2007 | Fawcett | |
| 2007/0192111 A1 | 8/2007 | Chasen | |
| 2009/0106124 A1 | 4/2009 | Yang | |
| 2009/0303040 A1 | 12/2009 | Srinivasa | |
| 2011/0059693 A1 | 3/2011 | O'Sullivan | |
| 2012/0030133 A1 | 2/2012 | Rademaker | |
| 2012/0109824 A1 | 5/2012 | Takatori | |
| 2013/0102283 A1 | 4/2013 | Lau | |
| 2013/0144428 A1 | 6/2013 | Irwin | |
| 2013/0261792 A1 | 10/2013 | Gupta | |
| 2014/0058902 A1 | 2/2014 | Taylor | |
| 2014/0081445 A1 | 3/2014 | Villamar | |
| 2014/0173638 A1 | 6/2014 | Anderson | |
| 2014/0236856 A1 | 8/2014 | Baykhurazov | |
| 2014/0278634 A1 | 9/2014 | Horvitz | |
| 2014/0278851 A1 | 9/2014 | Kopanati | |
| 2014/0278875 A1 | 9/2014 | Ganesh | |
| 2014/0316918 A1* | 10/2014 | Zaniker | G06Q 20/342 705/21 |
| 2014/0330603 A1* | 11/2014 | Corder | G05B 15/02 705/7.12 |
| 2015/0081581 A1 | 3/2015 | Gishen | |
| 2015/0106291 A1 | 4/2015 | Robinson | |
| 2015/0106296 A1* | 4/2015 | Robinson | G06F 21/62 705/339 |
| 2015/0120601 A1 | 4/2015 | Fee | |
| 2015/0161563 A1 | 6/2015 | Mehrabi | |
| 2015/0186840 A1* | 7/2015 | Torres | G06Q 10/0836 705/339 |
| 2015/0193731 A1 | 7/2015 | Stevens | |
| 2015/0199632 A1 | 7/2015 | Chander | |
| 2015/0206093 A1 | 7/2015 | Trew | |
| 2015/0227890 A1 | 8/2015 | Bednarek | |
| 2015/0242829 A1 | 8/2015 | Bhaskaran | |
| 2015/0339625 A1 | 11/2015 | Agasti | |
| 2015/0347961 A1 | 12/2015 | Gillen | |
| 2015/0348173 A1 | 12/2015 | Gillen | |
| 2015/0348345 A1 | 12/2015 | Ogishi | |
| 2015/0356366 A1 | 12/2015 | Jones | |
| 2015/0363843 A1 | 12/2015 | Loppatto | |
| 2015/0379796 A1* | 12/2015 | Glasgow | G09C 1/00 340/5.51 |
| 2016/0019669 A1 | 1/2016 | Gopalakrishnan | |
| 2016/0048804 A1 | 2/2016 | Paul | |
| 2016/0068264 A1 | 3/2016 | Ganesh | |
| 2016/0071056 A1 | 3/2016 | Ellison | |
| 2016/0078394 A1 | 3/2016 | Fuldner | |
| 2016/0086128 A1 | 3/2016 | Geiger | |
| 2016/0104112 A1 | 4/2016 | Gorlin | |
| 2016/0104113 A1 | 4/2016 | Gorlin | |
| 2016/0155072 A1 | 6/2016 | Prodromidis | |
| 2016/0189098 A1 | 6/2016 | Beaurepaire | |
| 2016/0195404 A1 | 7/2016 | Prasad | |
| 2016/0225115 A1 | 8/2016 | Levy | |
| 2016/0253624 A1 | 9/2016 | Sims | |
| 2016/0273922 A1 | 9/2016 | Stefan | |
| 2016/0328678 A1 | 11/2016 | Gillen | |
| 2016/0364678 A1 | 12/2016 | Cao | |
| 2016/0364679 A1 | 12/2016 | Cao | |
| 2016/0364812 A1 | 12/2016 | Cao | |
| 2016/0364823 A1 | 12/2016 | Cao | |
| 2016/0379167 A1 | 12/2016 | Raman | |

(56) References Cited

U.S. PATENT DOCUMENTS

| | | | |
|---|---|---|---|
| 2017/0032341 A1 | 2/2017 | Johnsrud | |
| 2017/0032382 A1 | 2/2017 | Shulman | |
| 2017/0083862 A1 | 3/2017 | Loubriel | |
| 2017/0089710 A1 | 3/2017 | Slusar | |
| 2017/0091891 A1 | 3/2017 | Van Der Berg | |
| 2017/0124510 A1 | 5/2017 | Caterino | |
| 2017/0140326 A1 | 5/2017 | Rhyu | |
| 2017/0215580 A1* | 8/2017 | Pitts | E05B 65/025 |
| 2017/0220976 A1 | 8/2017 | Schmidt | |
| 2017/0262804 A1* | 9/2017 | Shroff | G06Q 10/0838 |
| 2017/0310770 A1 | 10/2017 | Samaan | |
| 2017/0330145 A1* | 11/2017 | Studnicka | G06Q 10/0836 |
| 2017/0351994 A1 | 12/2017 | Waris | |
| 2018/0089474 A1 | 3/2018 | Ramon | |
| 2018/0096414 A1 | 4/2018 | Iacono | |
| 2018/0165636 A1 | 6/2018 | Wilkinson | |
| 2018/0165638 A1 | 6/2018 | Wilkinson | |
| 2018/0165639 A1 | 6/2018 | Wilkinson | |
| 2018/0165640 A1 | 6/2018 | Wilkinson | |

FOREIGN PATENT DOCUMENTS

| | | | |
|---|---|---|---|
| GB | 2372126 | 8/2002 | |
| GB | 2352314 B * | 11/2003 | A47G 29/141 |
| GB | 2520698 | 6/2015 | |
| WO | 2002007021 | 1/2002 | |

OTHER PUBLICATIONS

U.S. Appl. No. 15/841,130, dated Dec. 13, 2017, Bruce W. Wilkinson.
U.S. Appl. No. 15/841,141, dated Dec. 13, 2017, Bruce W. Wilkinson.
U.S. Appl. No. 15/842,035, dated Dec. 14, 2017, Bruce W. Wilkinson.
PCT; App. No. PCT/US2017/064867; International Search Report and Written Opinion dated Feb. 9, 2018.
PCT; App. No. PCT/US2017/065059; International Search Report and Written Opinion dated Feb. 23, 2018.
PCT; App. No. PCT/US2017/065320; International Search Report and Written Opinion dated Feb. 22, 2018.
PCT; App. No. PCT/US2017/065554; International Search Report and Written Opinion dated Feb. 22, 2018.
USPTO; U.S. Appl. No. 15/841,130; Office Action dated Jun. 19, 2020 (pp. 1-53).
USPTO; U.S. Appl. No. 15/841,141; Office Action dated Jun. 17, 2020 (pp. 1-35).
USPTO; U.S. Appl. No. 15/842,035; Office Action dated Aug. 12, 2020 (pp. 1-3).
USPTO; U.S. Appl. No. 15/841,130; Office Action dated Dec. 6, 2019 (pp. 1-48).
USPTO; U.S. Appl. No. 15/841,141; Office Action dated Nov. 18, 2019 (pp. 1-42).
USPTO; U.S. Appl. No. 15/842,035; Office Action dated Apr. 16, 2020.
USPTO; U.S. Appl. No. 15/842,035; Office Action dated Nov. 12, 2019 (pp. 1-62).

* cited by examiner

SYSTEM AND METHOD FOR DELIVERING PACKAGES TO CUSTOMERS

CROSS-REFERENCE TO RELATED APPLICATION

This application claims the benefit of U.S. Provisional Application No. 62/434,272, filed Dec. 14, 2016, which is incorporated herein by reference in its entirety.

TECHNICAL FIELD

This invention relates generally to delivering packages to customers.

BACKGROUND

Customers generally desire more efficient and effective use of their time. Similarly, retail stores desire not just efficient and effective use of employee time, but, also efficient and effective use of other resources available to them. While package delivery is a service frequently used by many customers, it remains an area of business that retail stores could improvement to provide customers with an improved experience. An effective customer delivery service generally translates to efficient use of resources with technological improvements thereby quickly and securely deliver products to a customer.

BRIEF DESCRIPTION OF THE DRAWINGS

Disclosed herein are embodiments of systems, apparatuses and methods pertaining to delivering packages to customers. This description includes drawings, wherein.

Figure 1:
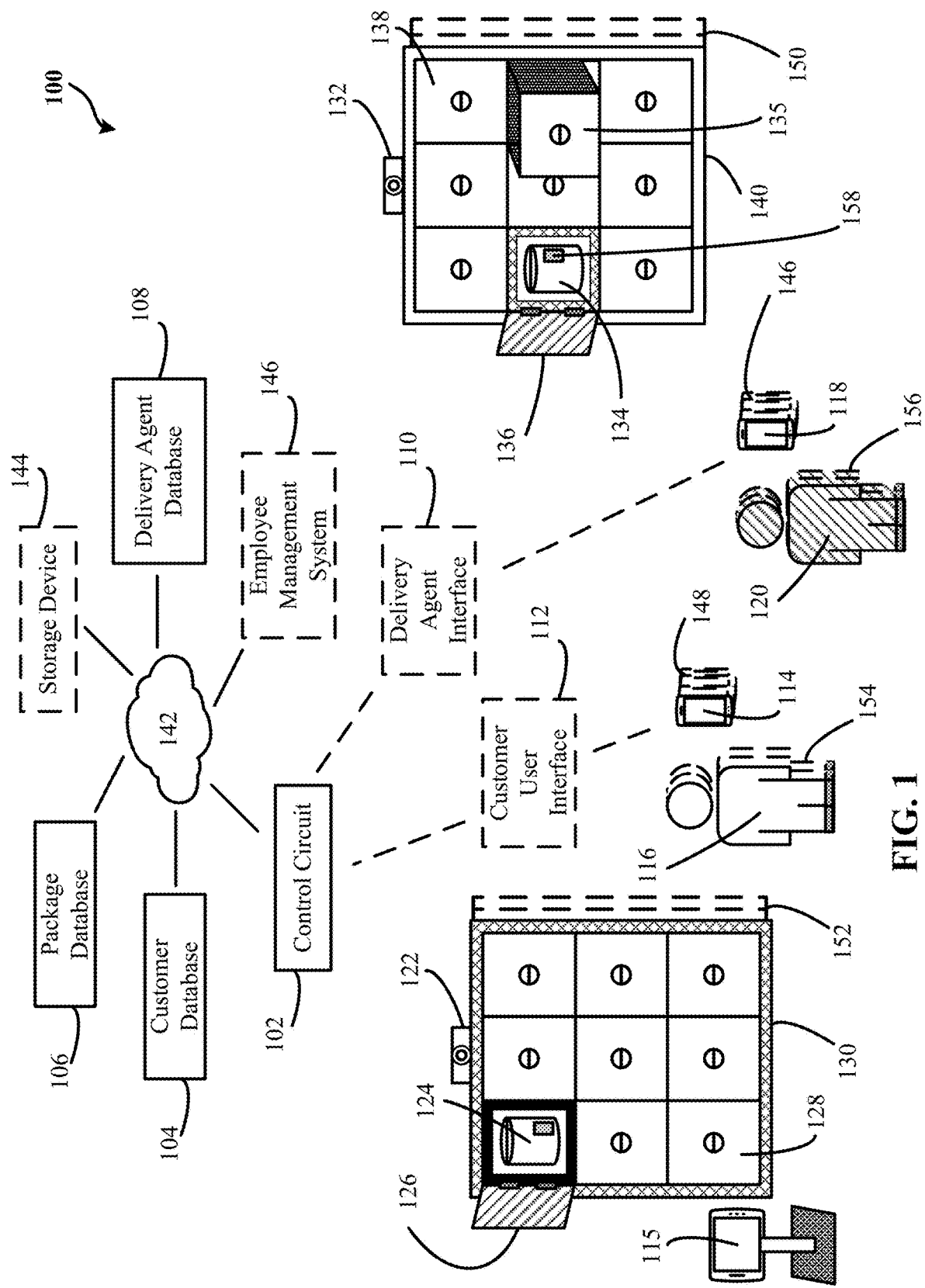
FIG. 1 is a schematic illustration of an exemplary system for delivering packages to customers in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for delivering packages to customers. By one approach, the packages are securely delivered by monitoring one or more different aspects, such as, for example, the delivery process, delivery agents, and/or the packages themselves. Further, in some configurations monitoring a number of different aspects permits using crowd-sourced delivery agents, which can increase the number of available delivery agents and potentially rendering delivery less expensive. In some embodiments, there is provided a system for delivering packages to customer using crowd-sourced delivery agents including one or more delivery agent electronic devices, one or more storage lockers at docking stations, a package database, and a control circuit. The one or more delivery agent electronic devices may be carried by separate and distinct delivery agents. In one configuration, the one or more storage lockers may be configured to retain one or more delivery containers or packages. By one approach, the package database stores relational data such as that corresponding to the docking stations, the one or more storage lockers associated with the docking stations, and the delivery container(s) associated with the storage locker(s). The control circuit also may be in communication with the one or more delivery agent electronic devices and the docking stations and also may access the package database.

In an illustrative approach, the control circuit is configured to determine locations of the delivery agents via the one or more delivery agent electronic devices and detect whether a location of a delivery agent is within a predetermined distance from a docking station that may have a number of storage lockers awaiting delivery. In response to the control circuit detecting that one of the delivery agents is located within a predetermined distance from the docking station, in one illustrative approach, the control circuit sends a delivery code to the delivery agent located within the predetermined distance, via a delivery agent electronic device. At the docking station, by one approach, the delivery code is received from the delivery agent and verified by the control circuit. Furthermore, in such a configuration, upon verification of the delivery code, the control circuit is configured to release a particular storage locker (associated with the delivery code) from the docking station for delivery of the particular storage locker to a customer recipient. In one configuration, the control circuit tracks delivery agents and determines distances of delivery agents from docking status having storage lockers (and packages) awaiting delivery.

While the docking stations may be stand-alone structures, the docking stations, in some configurations are incorporated into a physical retail shipping facility, a distribution center, a community facility, or a post office, among others. In yet another configuration, the docking stations may be an autonomous vehicle with storage lockers that are freely accessible to customers. In one exemplary configuration, the docking station(s) include one or more sensors configured to detect movement, sound, or electromagnetic signals. In this manner, the docking station is capable of detecting or receiving information to authenticate a delivery agent or customer arriving to retrieve a storage locker or packages therein.

In another aspect of such a configuration, the control circuit may verify an authentication aspect or factor of the delivery agent before unlocking the particular storage locker. As used herein the authentication aspects or factors may include, for example, receipt of a delivery or authentication code (that may be spoken or typed into a user interface, which may include a key pad, a microphone and/or speaker), walking gait detection, biometric authentication (such as retinal, fingerprint, body shape, or facial recognition scans, among others), Bluetooth confirmation, GPS-enabled history confirmation of the electronic device carried by the delivery agent (or the customer in some embodiments), or usage history of the electronic device carried by the delivery agent (or the customer in some embodiments). To that end, the systems described herein may include databases, such as a delivery agent database with profiles having, for example, details about the delivery agents, assigned or associated storage lockers, or delivery routes, among other aspects.

In another embodiment, the system includes a delivery agent interface or a consumer interface that is configured to be displayed on the delivery agent electronic device or the customer electronic device. Such an interface may be, for example, provided to the electronic device by the control circuit or configured to be executed by the delivery agent electronic device (or the customer device) when in communication with the control circuit.

In one configuration, the system may include a customer docking station associated with the customer recipient. Accordingly, a particular storage locker may be secured to the customer docking station upon verification with the control circuit. For example, a customer's home, garage, mailbox, or other customer controlled area may be outfitted with a structure that may securely receive and retain the particular storage locker delivered to the customer until the customer is able to retrieve the storage locker. By one approach, this occurs upon verification that the particular customer docking station is the proper location for delivery of the storage locker. In one illustrative approach, upon receipt of a storage locker by a customer, access to storage locker (e.g., access to the contents within the storage locker) requires customer authentication. Accordingly, before opening, a storage locker (and/or the control circuit) may require receipt of authenticating data to confirm the individual opening the storage locker is authorized. For example, customer authentication, as suggested above, may include input of a customer code via an electronic user interface associated with the particular storage locker, walking gait detection, biometric authentication, Bluetooth confirmation, GPS-enabled history confirmation, and/or usage history of an electronic customer device carried by the customer recipient, among others. As used herein, the authentication codes, such as delivery codes may be assigned by a customer upon submission of an order. In yet another approach, the control circuit adjusts the authentication level required for access to the customer docking station. This may be particularly helpful for situations where the delivered contents of the storage may warrant a different level of protection. For example, prescriptions or alcohol delivered in a storage locker may require a higher level of authentication to prevent children from accessing a storage locker. In yet another approach, a customer electronic device may be configured to remotely unlock a particular storage locker.

In some embodiments, there is provided a method for delivering packages to customers using crowd-sourced delivery agents including determining, by a control circuit, locations of a plurality of delivery agents via delivery agent electronic device(s). The delivery agent electronic devices may be carried by separate and distinct, crowd-sourced delivery agents. In one configuration, the method also includes detecting whether a delivery agent is within a predetermined distance from a docking station of a plurality of docking stations, which includes storage locker(s) awaiting delivery. In response to detecting that a delivery agent is within the predetermined distance from the docking station, a delivery code, in one approach, is sent, via a delivery agent electronic device, to the associated delivery agent. Further, in such a configuration, the method includes receiving the delivery code from the delivery agent and verifying the delivery code before releasing the associated storage locker from the docking station for delivery to a customer recipient.

In some embodiments, there is provided a system for delivering packages to customer using multi-factor customer authentication including at least one customer electronic device, one or more storage lockers at a docking station, a customer database, a package database, and a control circuit. The customer database may store customer profiles, where the customer profiles may have one or more customer aspects stored therewith. The package database may include the plurality of docking stations (and possibly the location thereof), associated plurality of storage lockers, and contents of the plurality of storage lockers. In operation, the control circuit is in communication with at least one customer electronic device and the docking station(s) and is configured to access the customer database and the package database.

By one approach, the control circuit associates a particular storage locker of the one or more storage lockers at the docking station with a particular customer profile of the customer database via the package database and detects the customer user approaching the docking station and a first authentication aspect from the customer user. A second authentication aspect from the customer user, in such a configuration, is received by the control circuit via the docking station. With this information, the control circuit compares the first authentication aspect with the particular customer profile associated with the particular storage locker being accessed and compares the second authentication aspect with the particular customer profile, where at least one of the first authentication aspect or the second authentication aspect may occur via the customer electronic device carried by the customer user. In one embodiment, the storage lockers are freely accessible to customer that can provide the first and second authentication aspects to retrieve a particular storage locker such that upon receipt of the first and second authentication aspects, the docking station releases the particular storage locker associated with the customer user. In another embodiment, the control circuit may monitor the customer electronic device carried by the customer user after retrieval of the particular storage locker to confirm that movement of the customer user is consistent with customer aspects associated with the particular customer profile. This may assist the control circuit with identifying individuals tampering with packages or other incidents of fraud.

In some embodiments, there is provided a method for retail distribution of products using multi-factor customer authentication including associating a particular storage locker at a docking station with a particular customer profile in a customer database, which is configured to store the customer profiles having one or more customer aspects stored therewith. The method also associates the storage locker and/or the contents thereof with the particular customer profile in the package database, which is configured to store relational data, such as, for example, corresponding to the plurality of docking stations, associated storage lockers, and contents of the storage lockers. In such a configuration, the method includes detecting a customer user approaching the docking station and a first authentication aspect from the customer user and receiving a second authentication aspect from the customer user via the docking station. With this information, the first and second authentication aspects are compared with the particular customer profile associated with the particular storage locker being accessed. In one illustrative embodiment, at least one of the first authentication aspect or the second authentication aspect occur via a customer electronic device carried by the customer user.

In some embodiments, there is provided a system for delivering packages to customer using a customer package scan to verify delivery of a package including delivery containers, a delivery agent database, a package database, a customer electronic device with a customer interface, and a control circuit. The delivery agent database may store a plurality of delivery agent profiles with one or more delivery agent aspects stored therewith. The package database may include data corresponding to the one or more delivery containers and associated delivery agents responsible for handling the one or more delivery containers. The control circuit may be in communication with the at least one customer electronic device and configured to access the delivery agent database and the package database. In such a configuration, the control circuit receives a retail order from a particular customer and associates a particular delivery container containing an item from the retail order with a particular customer profile of a customer database and each of the delivery agents responsible for handling the particular delivery container during shipment thereof from a retail facility to the particular customer. By one approach, an indication from a delivery agent regarding a location of the particular delivery container is received by the control circuit, which then updates the package database regarding the location of the particular delivery container. In operation, a customer receives the particular delivery container or package at the customer's home, delivery address, or another customer drop-site and, in response to receipt of the package, a customer electronic device conducts an electronic scan of the particular delivery container or package, which is then communicated to the control circuit. Upon receipt of a package scan from the customer electronic device via the customer interface, in one approach, the control circuit compares the package scan with the delivery agent aspect(s) associated with each delivery agents of the delivery agents responsible for handling the particular delivery container received by the particular customer.

In operation of such a system, the control circuit may compare and determine whether the package scan matches with delivery agent aspects responsible for handling the particular delivery container during shipment therefrom such that the system ensures that the individuals or agents responsible for delivering the container or package have properly delivered the container or the package, which may help prevent or avoid tampering or fraud. If the scan does not match the expected delivery agent aspects, a notification may be sent to the customer indicating the irregularity and/or noting that the package may have been tampered therewith. Thus, in one approach, a match in delivery agent aspects may be a match in delivery agents. The system also may send a notification to an employee management system indicating a request to investigate a possible tampering of a delivery container. Such a configuration also may include having a delivery agent electronic device that receives a customer authentication aspect from the particular customer prior to release of the particular delivery container to the particular customer. For example, the customer profile may have customer aspect(s) stored therewith such that the control circuit can compare the customer authentication aspect from the customer with the customer aspects associated with the particular customer in an associated customer profile.

By one approach, the delivery authentication aspects include, for example, tamper evident packaging material, biometric markers deposited onto a delivery container, and/or electromagnetic signals provided by passive sensors incorporated into the particular delivery container, among others. As suggested above, the customer electronic device may be configured to scan the delivery container for one or more of these delivery authentication aspects.

In some embodiments, there is provided a method for verifying delivery of one or more packages using a customer package scan including receiving a retail order from a particular customer and associating a particular delivery container containing an item from the retail order with a particular customer profile and each of delivery agents responsible for handling the particular delivery container during its shipment from a retail facility to the particular customer. In one exemplary operation, an indication from one or more delivery agents regarding a location of the particular delivery container is received and then a package database is updated with the location of the particular delivery container accordingly. The package database may store data corresponding to the one or more delivery containers and associated delivery agents responsible for handling the one or more delivery containers. By another approach, the method includes comparing a package scan with delivery agent aspects of a delivery agent database, which are associated with each of the delivery agents responsible for handling the particular delivery container upon receipt of the package scan from a customer electronic device associated with the particular customer via a customer interface.

In some embodiments, there is provided a system for delivering packages to customers using delivery agent data from a customer drop-site to verify delivery of a package including delivery containers, a delivery agent database that stores agent profiles with agent aspects therein, a package database, customer electronic devices, and a control circuit. In such a configuration, the package database typically stores data corresponding to the delivery containers and associates the delivery agents responsible for handling of the delivery container(s). In one exemplary embodiment, the customer electronic device (which is associated with a customer drop-site) includes at least one sensor that is configured to detect electromagnetic signals from delivery agent electronic devices, movement, and/or sound and the customer.

By one approach, the control circuit receives a retail order from a particular customer and associates a particular delivery container containing an item from the retail order with a particular customer profile and each of the delivery agents responsible for handling the particular delivery container during its shipment from a retail facility to the particular customer. In such a configuration, the control circuit receives an indication from the delivery agent(s) regarding a location of the particular delivery container and updates the package database regarding the location of the particular delivery container accordingly. In another aspect, the control circuit receives sensed data from a customer electronic device associated with the customer drop-site and upon receipt of the sensed data, authenticates (or attempts to authenticate) that the particular delivery container was delivered by the delivery agents responsible for handling the particular delivery container received by the particular customer by comparing the sensed data with associated delivery agent profile and the delivery agent aspects. To that end, the associated delivery agent profile and the delivery agent aspects may be associated with the delivery agents responsible for handling the particular delivery container. In operation, the sensed data from the customer electronic device may include a unique delivery container identifier associated with the particular delivery container and a unique retail order identifier or a unique item identifier associated with an item from the retail order.

In one aspect, the control circuit, in communication with the electronic user devices, may determine whether a particular delivery container has reached a predetermined distance from the customer drop-site based on at least one of the retail order, the package database, or the sensed data. For example, the control circuit may retrieve, for example, destination address, from the retail order and/or the package database and compare the destination address with locational information and/or customer electronic device identifier associated with the sensed data and, subsequently, determine, based on the comparison, whether the particular delivery container has reached the predetermined distance from the customer drop-site.

In another aspect, the control circuit may provide a delivery code to the customer electronic device, which may then send the code back to the control circuit upon a determination by the particular customer that a unique retail order identifier associated with the particular container corresponds to the retail order. To that end, upon a determination that the unique retail order identifier does not correspond to the retail order, the control circuit may send a notification to retrieve the particular delivery container from the customer drop-site by the delivery agent(s) responsible for handling thereof.

In some embodiments, there is provided a method for verifying delivery of one or more items using delivery agent data from a customer drop-site including receiving, at a control circuit, a retail order from a particular customer and associating a particular delivery container containing an item from the retail order with a particular customer profile and each of delivery agents responsible for handling the particular delivery container during its shipment from a retail facility to the particular customer. In one exemplary operation, an indication is received from a delivery agent regarding a location of the particular delivery container and the package database is updated regarding the location of the particular delivery container accordingly. In such a configuration, the method receives sensed data from the customer electronic device associated with the customer drop-site and, upon receipt thereof, authenticating that the particular delivery container was delivered by the delivery agents responsible for handling the particular delivery container received by comparing the sensed data with delivery agent profile(s) and associated delivery agent aspects. Accordingly, the delivery agent profile and the associated delivery agent aspects may be associated with the delivery agents responsible for handling the particular delivery container and the package database may include relational data corresponding to the one or more delivery containers and delivery agents responsible for handling the one or more delivery containers.

In one illustrative approach, there is provided a system for delivering packages to customer that enables a customer to submit an order via a customer user interface. The customer user interface may be executed in a customer electronic device, which may be carried by the customer. The order may include one or more items, such as retail items. Upon receipt of the order, an associate of the retail shopping facility may place items from the order into a delivery container. The delivery container may be placed inside one of storage lockers of a docking station, which may be free-standing or located in or near a retail shopping facility. The docking station may also be incorporated into a distribution center, a community facility, and/or a post office, among other locations. Either the storage locker having the delivery container or the delivery container is taken by a delivery agent and delivered to the customer. In one scenario, the delivery agent may take the storage locker to a customer docking station, where the customer may retrieve the storage locker. The customer docking station, which is generally disposed at a convenient location for the customer to access, may be incorporated into, at or near the customer's house or property, a physical retail shopping facility, a distribution center, a community facility, and a post office, among other locations. By one approach, the customer docking station may be a docking station in another retail shopping facility or a distribution center associated with the retail shopping facility. In such a configuration, these other retail facilities or distribution centers are generally conveniently located near a customer's home and also may be accessible at a variety of hours including outside of normal business hours.

As noted above, some configurations employ delivery agents to facilitate delivery of the lockers, containers, or packages directly to consumers. By one approach, a control system may detect that a delivery agent is approaching the docking station and determine delivery agent aspects of the delivery agent based on a delivery agent electronic device carried by the delivery agent or one or more sensors associated with the docking station. The control circuit may then compare the determined delivery agent aspects with delivery agent aspects stored in a delivery agent database. Upon a determination that there is a match, the storage locker having the delivery container is released to the delivery agent. By another approach, the control circuit may send a delivery code to the delivery agent, which may then be used to authenticate or verify the delivery agent before releasing a storage locker to the delivery agent. The delivery agent may authenticate itself to the docking station using the delivery code. Upon receiving the delivery code, the control circuit may release the storage locker to the delivery agent. Moreover, the delivery agent may be determined by the control circuit based on the delivery agent associated with the storage locker in a package database. For example, to determine a delivery agent to deliver a storage locker, the control circuit may access a package database and perform, in one operation, a search on the storage locker and determine the delivery agent associated with the storage locker. In one approach, the package database may include relational data corresponding to the association of: the item, the delivery container, the storage locker, the docking station, one or more delivery agents, and/or the customer docking station.

In one configuration, a plurality of authentication aspects may be used to authenticate the delivery agent to the docking station. Further, one or more levels of authentication may be assigned by the control circuit to the storage container based on contents of the storage locker. The one or more levels of authentication may be based on a plurality of different authentication aspects. By another approach, the customer may have customer aspects associated with a customer profile stored in a customer database. Similar to the delivery agents, a plurality of authentication aspects may be used to authenticate the customer to the customer docking station. Further, one of the plurality of authentication aspects associated with the customer may include a delivery code. A delivery code or an authentication code may have been created by the customer during submittal of the order. The authentication code may correspond to a word or phrase the customer may use to speak into a user interface or typed into the user interface of the customer docking station to release the storage locker. Thus, the systems and methods described above and illustrated below provide improvements on package delivery to customers. For example, by having multi-factor or multi-aspect authentication of customers and/or delivery agents arriving at a docking station to retrieve storage lockers and/or containers, it is easier to prevent unauthorized access to or tampering with the storage lockers and/or containers.

To illustrate, a non-limiting, exemplary system 100 for delivering packages to customers is shown at FIG. 1. The system 100 may correspond to a package delivery system, and/or a retail distribution system, among other systems configured to deliver packages. The system 100 may include one or more delivery agent electronic devices 146, one or more storage lockers 138 at docking stations 150, a package database 106, and a control circuit 102. One or more separate and distinct delivery agents 156 may carry the delivery agent electronic devices 146. A delivery agent 120 of the delivery agents 156 may include a shopper at a retail store, an employee of the retail store whose shift just ended, a customer who made an online order, a person who chose to make a delivery or be part of crowd-sourced delivery agents, among others. The delivery agent 120 may register a delivery agent electronic device 118 of the delivery agent electronic devices 146 via the control circuit 102. The delivery agent electronic device 118 may include a tablet, a smartphone, a computer, a laptop, a smartwatch, or any electronic communication devices capable of communication with the control circuit 102. A delivery agent interface 110 may be displayed on the delivery agent electronic device 118. The delivery agent interface 110 may be provided to the delivery agent electronic device 118 by the control circuit 102 and/or executed by the delivery agent electronic device 118 when in communication with the control circuit 102. In one configuration, the delivery agent interface 110 may couple the delivery agent electronic device 118 with the control circuit 102 via a communication network 142. The communication network may include one or more of a wired network, a wireless network, a distributed network, a public network, a private network, a wide area network, a local area network, or any one or more communication networks that allow communications between various computers, servers, systems, and/or any electronic devices.

The control circuit 102 may also be in communication with the docking stations 150. A docking station 140 of the docking stations 150 may include the one or more storage lockers 138. The docking stations 150 may, for example, be stand-alone structures or be incorporated into at least one of: a physical retail shopping facility, a distribution center, a community facility, or a post office, among other facilities. Further, each of the storage lockers 138 is configured to retain one or more delivery containers, packages, and/or retail products. A delivery container 134 of the one or more delivery containers may include one or more items listed on at least one retail order submitted by a customer 116 of one or more customers 154. The customer 116 (who may also be referred to as customer user) may place the at least one retail order via a computing device in communication with the control circuit via a network (such as via the Internet), a kiosk, a physical retail store, or any means of placing the at least one retail order. The package database 106 may store relational data corresponding to the docking stations 150, the storage lockers 138 associated with the docking stations 150, and the one or more delivery containers associated with the storage lockers 138.

For example, the package database 106 may include the docking stations 150 associated with a retail shopping facility. The package database 106 may also include the storage lockers 138 that are associated with a particular docking station. To illustrate, a first docking station may be located at a first retail shopping facility and a second docking station may be located at a second retail shopping facility. Further, a first delivery container may be secured inside a first storage locker of the first docking station while a second storage locker of the second docking station is empty. Thus, the package database 106 may store data indicating that the first delivery container is associated with the first storage locker of the first docking station, where the first docking station is associated with the first retail shopping facility. The package database 106 may also store data indicating that the second storage locker of the second docking station in the second shopping facility is empty, such that, for example, it could receive the first delivery container if it were moved or delivered to the second docking station, which may be conveniently located to a customer.

By one approach, the delivery container 134 may include an item ordered by the customer 116. The delivery agent 120 may deliver the item to a number of locations, such as, for example, the customer 116 or another storage locker. The item may have been placed inside the delivery container 134 by an associate of the first retail shopping facility. During the delivery, to determine which one of the storage lockers 138 includes the delivery container 134, the control circuit 102 may access the package database 106. To track the delivery container 134, the control circuit 102 may determine locations of the delivery agent 120, for example, via the delivery agent electronic device 118 or a sensor associated with the delivery container. In one scenario, the delivery container 134 may be carried by multiple delivery agents 156, such as, for example, if the delivery container would be most efficiently, inexpensively, or quickly delivered via multiple agents, depending possible delivery agent routes. The delivery container 134 may also be secured to different storage lockers associated with different docking stations at different point in time during the delivery.

Moreover, in one configuration, at a predetermined period during the delivery, the control circuit 102 may detect whether a location of the delivery agent 120 is within a predetermined distance from the docking station 140, which may include a number of storage lockers 138 awaiting delivery. One or more of the storage lockers 138 may contain items ordered by other customers 154. In response to the detection that the delivery agent's location is within the predetermined distance from the docking station 140, the control circuit 102 may provide the delivery agent the opportunity to deliver another delivery container or storage locker 138. In operation, the control circuit 102 may send, at a first time, a delivery code to the delivery agent 120 via the delivery agent electronic device 118 that is associated with the delivery agent 120. The delivery agent 120 may send, at a second time, the delivery code back to the control circuit 102 via the delivery agent electronic device 118 or the docking station 140 to indicate acceptance of the opportunity to deliver the storage locker 138 being sent to another customer or to retrieve the storage locker 138 being sent to another customer.

Moreover, the control circuit 102 may verify whether the delivery code received, at the second time, from the delivery agent 120 is the same delivery code the control circuit 102 had sent at the first time. Upon a determination by the control circuit 102 that the delivery code received at the second time is the same as the delivery code sent at the first time, the control circuit 102 may release a particular storage locker 136 from the docking station 140 for delivery of the particular storage locker 136 to the customer 116, 154 (who may also be referred to as a customer recipient).

In one configuration, the delivery code may be provided to the delivery agent electronic device 118 via a text message and is received from the delivery agent 120 via a docking station interface of the docking station 140 to assist with authentication of the delivery agent 120. In another configuration, the delivery code may be delivered to the delivery agent electronic device 118 and received from the delivery agent 120 via a microphone at the docking station interface to assist with authentication of the delivery agent 120.

The delivery code may be an example of an authentication aspect associated with the delivery agent 120. By one approach, the delivery code may be assigned by the customer 116 to the particular storage locker 136 upon submission of a product order (which may also be referred to as the retail order). The control circuit 102 may associate the particular storage locker 136 with the delivery code. By another approach, the authentication aspect may also include walking gait detection, biometric authentication, Bluetooth confirmation, GPS-enabled history confirmation of the delivery agent electronic device 118 carried by the delivery agent 120, and/or usage history of the delivery agent electronic device 118 carried by the delivery agent 120. By another approach, the control circuit 102 may verify the authentication aspect of the delivery agent 120 before unlocking the particular storage locker 136 from the docking station 140. By verifying the authentication aspect of the delivery agent 120, the control circuit 102 may determine that the delivery agent 120 is the delivery agent assigned to take the particular storage locker 136 from the docking station 140.

By one approach, the system 100 may include a delivery agent database 108. The delivery agent database 108 may be coupled with the control circuit 102 and may include a plurality of delivery agents and corresponding delivery agent profiles. A particular delivery agent profile that is associated with a particular delivery agent may include, for example, information on a storage locker assigned to the particular delivery agent, a particular delivery route, and/or a particular docking station. For example, delivery agent profile associated with the delivery agent 120 may include one or more delivery routes, the particular storage locker 136, the delivery container 134, and/or the docking station 140. Assignment of the storage lockers 138, the delivery routes, the delivery container 134, and/or the docking station 140 to the delivery agent 120 may facilitate tracking of the delivery container 134. The control circuit 102 may determine the assignment based on, for example, customer requests or resources available to the retail shopping facility, such as transport vehicles, delivery agents, and/or available docking stations and/or storage lockers, among other factors.

In one configuration, a customer docking station 130 may be associated with the customer 116 (which may also be referred to as the customer recipient). By one approach, the customer docking station 130 may be associated with multiple customers 154 or may have the structure configured to receive only a single delivery container (see, e.g., FIG. 12). By another approach, the customers 116 may be associated with a plurality of customer docking stations 152. Further, the final delivery destination of the particular storage locker 136 may be the customer docking station 130, at which a customer may come and retrieve the delivery container 134 or the packages and or retail products therein. The particular storage locker 136 may be secured to the customer docking station 130 upon verification with the control circuit 102. The verification may ensure that the particular storage locker 136 is approved by control circuit 102 to be secured to the customer docking station 130. The approval may be based on the retail order, the package database 106, the delivery agent database 108, a unique delivery container identifier associated with the delivery container 134, and/or a unique retail order identifier associated with the retail order. For example, the control circuit 102 may determine whether the customer docking station 130 is the final destination of the particular storage locker 136 based on the data associated with the delivery container 134 in the package database 106. The control circuit 102 may also determine whether the customer docking station 130 is the final destination of the particular storage locker 136 based on the unique delivery container identifier associated with the delivery container 134 contained therein. The control circuit 102 may determine the unique delivery container identifier from data received from one or more sensors associated with the delivery container 134.

By one configuration, the customer docking station 130 may include a plurality of customer storage lockers 128. The customer docking station 130 may also include one or more sensors 122. The one or more sensors 122 may detect movement, sound, and/or electromagnetic signals. The sensors 122 may include proximity sensors, radio frequency (RF) sensors, video camera with capability to recognize facial expressions and/or features, and/or any type of sensors that may detect and/or recognize a customer electronic device 114 and/or the customer 116. The customer electronic device 114 may include a tablet, a smartphone, a computer, a laptop, a smartwatch, or any electronic communication devices capable of communication with the control circuit 102.

In one embodiment, the particular storage locker 136 may be fixed to the docking station 140. As such, the delivery container 134 may be moved by the delivery agent 120 from the docking station 140 to another docking station and/or from the docking station 140 to the customer docking station 130. In another embodiment, the particular storage locker 136 may be portable and/or movable as illustrated by storage locker 135. For example, the storage locker 135 may be removed from the docking station 140 for delivery with the delivery container 134 therein to the customer docking station 130. In another embodiment, either the customer storage locker 126 or the customer delivery container 124 may be moved from the customer docking station 130 to the docking station 140.

In another configuration, the control circuit 102 may assign an authentication level required for access to the customer docking station 130 depending on contents of the particular storage locker 136, such as upon securing the particular storage locker 136 at the customer docking station 130 or upon packing the delivery container 134 in the storage locker 136. The control circuit 102 also may adjust the authentication level required for access to the customer docking station 130 depending on a determination by the control circuit 102 of the contents of the particular storage locker 136. For example, the control circuit 102 may assign an initial authentication level for access to the particular storage locker 136 via the customer docking station 130 upon securing the particular storage locker 136 at the customer docking station 130. The control circuit 102 may determine the contents of the particular storage locker 136. Upon the determination of the contents of the particular storage locker 136, the control circuit 102 may adjust the authentication level accordingly. In one scenario, the control circuit 102 may require customer authentication prior to opening the particular storage locker 136. The customer authentication may be based on the authentication level assigned to the particular storage locker 136 by the control circuit 102.

The authentication level may include one or more customer authentication aspects (or authentication methods). The authentication aspects may include walking gait detection, biometric authentication, Bluetooth confirmation, GPS-enabled history confirmation of: a customer electronic device carried by a customer or the delivery agent electronic device carried by a delivery agent, or usage history of: the delivery agent electronic device or the customer electronic device. The authentication aspect may also include an authentication code associated with the particular storage locker 136 and/or receipt of the authentication code. The authentication code may include one or more codes spoken into a user interface of a docking station and/or typed into the user interface of the docking station. The authentication code may be the one or more codes created and provided by the customer 116 at the time the retail order is submitted. The one or more codes may include any passwords and/or phrases created by the customer 116. In one configuration, the customer electronic device 114 may include accelerometers to identify a unique walking gait of the customer 116.

By one approach, the system 100 may include the customer electronic device 114 in communication with the control circuit 102. In one configuration, the system 100 may include a plurality of customer electronic devices 148 associated with the customers 154. The control circuit 102 may remotely unlock the particular storage locker 136 upon receipt of instructions from the customer electronic device 114 associated with the particular storage locker 136. The instructions may be associated with one or more inputs from the customer 116 using a customer user interface 112. The customer user interface 112 may be displayed on the customer electronic device 114. In another configuration, the customer user interface 112 may be displayed on a second customer electronic device 115, where the second customer electronic device 115 may be may be located or stationed at a customer drop site. The customer user interface 112 may be provided to the customer electronic device 114 by the control circuit 102 and/or executed by the customer electronic device 114 when in communication with the control circuit 102. The instructions may be associated with various authentication aspects.

By another approach, the control circuit 102 may track the delivery agents 156 and determine distances of the delivery agents 156 from the docking stations 150. The docking station 140 may also include one or more sensors 132 that can detect delivery agents 156 within a certain predetermined distance. The one or more sensors 132 may detect movement, sound, and/or electromagnetic signals. Further, the one or more sensors 132 may be placed anywhere in, at, or near the docking station 140.

In another implementation, the system 100 may include a customer database 104. The customer database 104 may store customer profiles having one or more customer aspects stored therewith. Thus, the customer database 104 may store the one or more customer aspects of a plurality of customers. The customer 116 may be associated with particular customer aspects, where the particular customer aspects are uniquely associated with the customer 116. The particular customer aspects may include delivery code created by the customer 116, walking gait, biometric markers, Bluetooth confirmation from the customer electronic device 114, GPS-enabled history confirmation of the customer electronic device 114, and/or usage history of the customer electronic device 114, where the customer electronic device 114 may be carried by and/or associated with the customer 116.

By one approach, the control circuit 102 may be in communication with the customer electronic device 114 and the docking stations 150. Further, the control circuit 102 may access the customer database 104 and the package database 106. The control circuit 102 may also associate the particular storage locker 136 at the docking station 140 with a particular customer profile of the customer database 104 via the package database 106. For example, the control circuit 102 may associate the customer 116 with the particular storage locker 136 by accessing the package database 106 and determining which one of the storage lockers 138 has the delivery container 134, where the delivery container 134 includes the items ordered by the customer 116 via at least one of online retail portal, a kiosk, a retail store, the customer user interface 112, or any means of placing retail orders. Upon the determination that the particular storage locker 136 includes the delivery container 134, the control circuit 102 may associate the particular storage locker 136 with the particular customer profile of the customer 116 in the customer database 104.

The customer 116 may order the items using the customer electronic device 114 via the customer user interface 112. The customer 116 may also couple with the docking station 140 or the customer docking station 130 via the customer user interface 112. The customer user interface 112 may be provided to the customer electronic device 114 upon a determination that the customer electronic device 114 does not have the customer user interface 112. In another configuration, the control circuit 102 may determine whether the customer electronic device 114 includes the customer user interface 112. Upon determining that the customer user interface 112 is included, the customer user interface 112 is automatically executed by the customer electronic device 114.

The control circuit 102 may also detect when the customer 116 approaches the docking station 140, such as, for example, when arriving at the docking station 140 and/or the customer docking station 130 to retrieve a storage locker, delivery container, and/or retail products or items from an order. The control circuit 102 may also detect a first authentication aspect from the customer 116. By one approach, the control circuit 102 may receive a second authentication aspect from the customer 116 via the docking station 140. The first and second authentication aspects may include the delivery code created by the customer 116, receipt of the authentication code, walking gait detection, biometric authentication, Bluetooth confirmation, GPS-enabled history confirmation of the customer electronic device 114 carried by the customer 116, and/or usage history of the customer electronic device 114 carried by the customer 116.

In one configuration, prior to accessing the particular storage locker 136, the control circuit 102 may compare the first authentication aspect with the particular customer profile associated with the particular storage locker 136. For example, the control circuit 102 may perform facial recognition on the customer 116 via the one or more sensors 132. The control circuit 102 may then compare the resulting facial recognition with the particular customer profile associated with the particular storage locker 136 prior to accessing the particular storage locker 136 and releasing its contents to the customer 116.

In another configuration, the control circuit 102 may also compare the second authentication aspect with the particular customer profile prior to accessing the particular storage locker 136. For example, the control circuit 102 may compare a thumbprint, for example, of the customer 116 with the second authentication aspect in the particular customer profile associated with the particular storage locker 136. In this scenario, the second authentication aspect includes the biometric authentication of the customer 116, where the biometric authentication may include at least the thumbprint of the customer 116. Biometric authentication may include finger prints, retinal scans, face recognition, voice prints, and/or typing patterns. As such, the control circuit 102 may utilize a two-level authentication to access any of the storage lockers 138. In another configuration, the control circuit may utilize three or more levels of authentication to access one or more of the storage lockers 138.

By one approach, the control circuit 102 may customize the authentication level for each of the storage lockers 138. For example, the authentication level for one storage locker may be the walking gait detection and the GPS-enabled history confirmation while the authentication level for another storage locker may be the delivery code and the Bluetooth confirmation. The assignment of the authentication level for each of the storage lockers 138 may be based on respective contents of each of the storage lockers 138, location of the docking stations 150, and/or electronic security capabilities of the customer electronic device 114 and/or the delivery agent electronic device 118. By another approach, the first authentication aspect or the second authentication aspect may occur via the customer electronic device 114 carried by the customer 116.

By another approach, the docking station 140 may include an autonomous vehicle, where the autonomous vehicle may include the storage lockers 138 that are freely accessible to the customer 116 and, upon providing a first and second authentication aspects, may be retrievable therefrom. The first and second authentication aspects may be provided to retrieve the particular storage locker 136 such that upon receipt of the first and second authentication aspects, the docking station 140 may release the particular storage locker 136 associated with the customer 116. Generally, the control circuit 102 verifies the first and second authentication aspects prior to releasing the particular storage locker 136 by comparing the first and second authentication aspects with the particular customer aspects associated with the customer 116 stored in the customer database 104.

In a configuration where the delivery agent 120 may deliver the delivery container 134 directly to the customer 116, the delivery agent electronic device 118 may receive a first authentication aspect and/or a second authentication aspect from the customer 116 prior to the delivery agent 120 releasing the delivery container 134 to the customer 116. By another approach, the control circuit 102 may also update the package database 106 indicating that the delivery has been completed based on the receipt of the first and second authentication aspects by the delivery agent 120.

In a configuration where the customer retrieves the storage locker, delivery container, and/or retail products or items from the docking station (as opposed to a delivery agent delivering them directly to the customer), the control circuit 102 may detect when the customer 116 approaches the docking station 140 via the sensors 132 and/or the customer electronic device 114 carried by the customer 116 (similar to the manner in which the sensors 132 detect the delivery agent as previously discussed). In yet another configuration, the docking station 140 may be configured to receive or detect authentication aspects and release storage lockers to either customers themselves or delivery agents who are properly verified. The sensors 132 may include proximity sensors, radio frequency (RF) sensors, video camera with capability to recognize facial expressions and/or features, and/or any type of sensors that may detect and/or recognize the customer electronic device 114 and/or the customer 116. By one approach, the control circuit 102 may monitor the customer electronic device 114 carried by the customer 116 after retrieval of the particular storage locker 136 to confirm that movement of the customer 116 is consistent with the particular customer aspects associated with the particular customer profile of the customer 116. Monitoring the movement of the customer 116 may include tracking locations of the customer electronic device 114 carried by the customer 116. If the movement is not consistent with the particular customer aspects associated with the customer 116, the control circuit 102 may send a notification to an employee management system 146 indicating a request to investigate a possible theft or error on delivery of the delivery container 134.

In another implementation, the system 100 may include the delivery agent database 108. By one approach, the delivery agent database 108 may store delivery agent profiles of the delivery agents 156. The delivery agent profiles may include delivery agent aspects stored therewith. The delivery agent aspects may include biometric markers, walking gait, facial characteristics, and/or body shape, among others. Thus, each delivery agent may have particular delivery agent aspects associated with the delivery agent in the delivery agent database 108. Generally, the biometric markers may include fingerprints, retinal scan, and/or DNA markers, among others.

In some illustrative configurations, the control circuit 102 may receive the retail order from the customer 116 and may associate at least one item from the retail order with the delivery container 134. In one scenario, the control circuit 102 may determine that one or more items from the retail order should be associated with another delivery container associated with one of the storage lockers 138. The control circuit 102 may also associate the delivery container 134 with the particular customer profile of the customer database 104. In another scenario, the control circuit 102 may also associate the delivery container 134 with each of the delivery agents 156 responsible for handling the delivery container 134 during its shipment from the retail facility to the customer 116.

By one approach, the control circuit 102 may receive an indication from the delivery agent 120 regarding a location of the delivery container 134. For example, a global positioning system (GPS) location of the delivery agent electronic device 118 may be provided to the control circuit 102 for a particular period of time until the control circuit 102 determine that the GPS location of the delivery agent electronic device 118 matches with location of the customer docking station 130 based on the customer database 104, the package database, and/or the retail order. Upon receipt of the indication, the control circuit 102 may update the package database 106 regarding the location of the delivery container 134.

In another illustrative embodiment, upon delivery of a package or the delivery container 134 to the customer, the customer 116 may scan the delivery container 134 using the customer electronic device 114 via the customer user interface 112. The customer electronic device 114 may output a package scan (i.e., scan data resulting from scanning the delivery container 134) to the control circuit 102. Subsequently, the control circuit 102 may compare the package scan with the delivery agent aspects associated with each delivery agents responsible for handling the delivery container 134 received by the customer 116 upon receipt of the package scan from the customer electronic device 114 via the customer user interface 112. For example, a delivery container 134 or package to be delivered to a customer by a delivery agent may be wrapped in tamper evident paper or film configured to detect or capture identifiers of the individuals handling the tamper-evident wrapper. In this manner, upon receipt of the package with the tamper-evident wrapper, a customer may use the customer electronic device 114 to scan the package to identify the tamper-evident markings left by those handling the package and the package scan can then be compared to the databases, via the control circuit 102, to confirm whether only authorized delivery agents have been handling the package or delivery container 134. In another similar embodiment, a package, retail product and/or retail item may be wrapped in a tamper-evident wrapper and then subsequently shipped in the delivery container 134. In this manner, when the customer receives the delivery container 134, the customer can open the delivery container 134 and, using the customer electronic device 114, scan the package, retail product, and/or retail item wrapped in the tamper-evident wrapper to determine whether there were any markings on the tamper-evident wrapper indicating tampering or access to the contents inside the delivery container 134.

By one approach, the control circuit 102 may determine a listing of delivery agents based on the comparison of the package scan with one or more delivery agent aspects of the delivery agent database 108. The listing of delivery agents may be stored in a storage device 144. In a configuration where a substitution or an addition of at least one delivery agent is determined by the control circuit 102, the control circuit 102 may update the delivery agent database 108 to include one or more delivery agent aspects of the substituted or added delivery agent. As such, when the control circuit 102 make the comparison of the package scan with the one or more delivery agent aspects of the delivery agent database 108, the control circuit 102 may recognize the delivery agent aspects associated with the substituted or added delivery agent.

In a scenario where the package scan does not match with the delivery agent aspects in the delivery agent database 108, the control circuit 102 may send a first notification to the customer 116 indicating that the delivery container 134 may have been tampered with. The control circuit 102 may also send a second notification to the employee management system 146 indicating a request to investigate a possible tampering of the delivery container 134.

By another approach, the customer electronic device 114 may scan the delivery container 134 for one or more delivery authentication aspects. The delivery authentication aspects may include tamper evident packaging material, biometric markers deposited onto the delivery container 134, or electromagnetic signals provided by passive sensors 158 incorporated into the delivery container 134. A passive sensor 158 may include proximity sensor, RF sensor, video camera, and/or any type of sensors that are capable of detecting product tampering and/or biometric markers of individuals that come in contact with the delivery container 134.

As noted above, the system 100 may include the delivery agent electronic device 118. In one configuration, the delivery agent electronic device 118 may receive a customer authentication aspect from the customer 116 prior to release of the delivery container 134 to the customer 116. The control circuit 102 may compare the received customer authentication aspect from the customer 116 with the particular customer aspects associated with the customer 116 in an associated customer profile of the customer profiles of the customer database 104. For example, a sensor camera of the delivery agent electronic device 118 may receive and analyze a finger print of the customer 116. The delivery agent electronic device 118 may send the captured image to the control circuit 102 for comparison. The control circuit 102 may compare the finger print from the captured image of the customer 116 with the particular customer aspects associated with the customer 116 in an associated customer profile of the customer database 104. The associated customer profile may include stored data associated with the walking gait of the customer 116.

Figure 12:
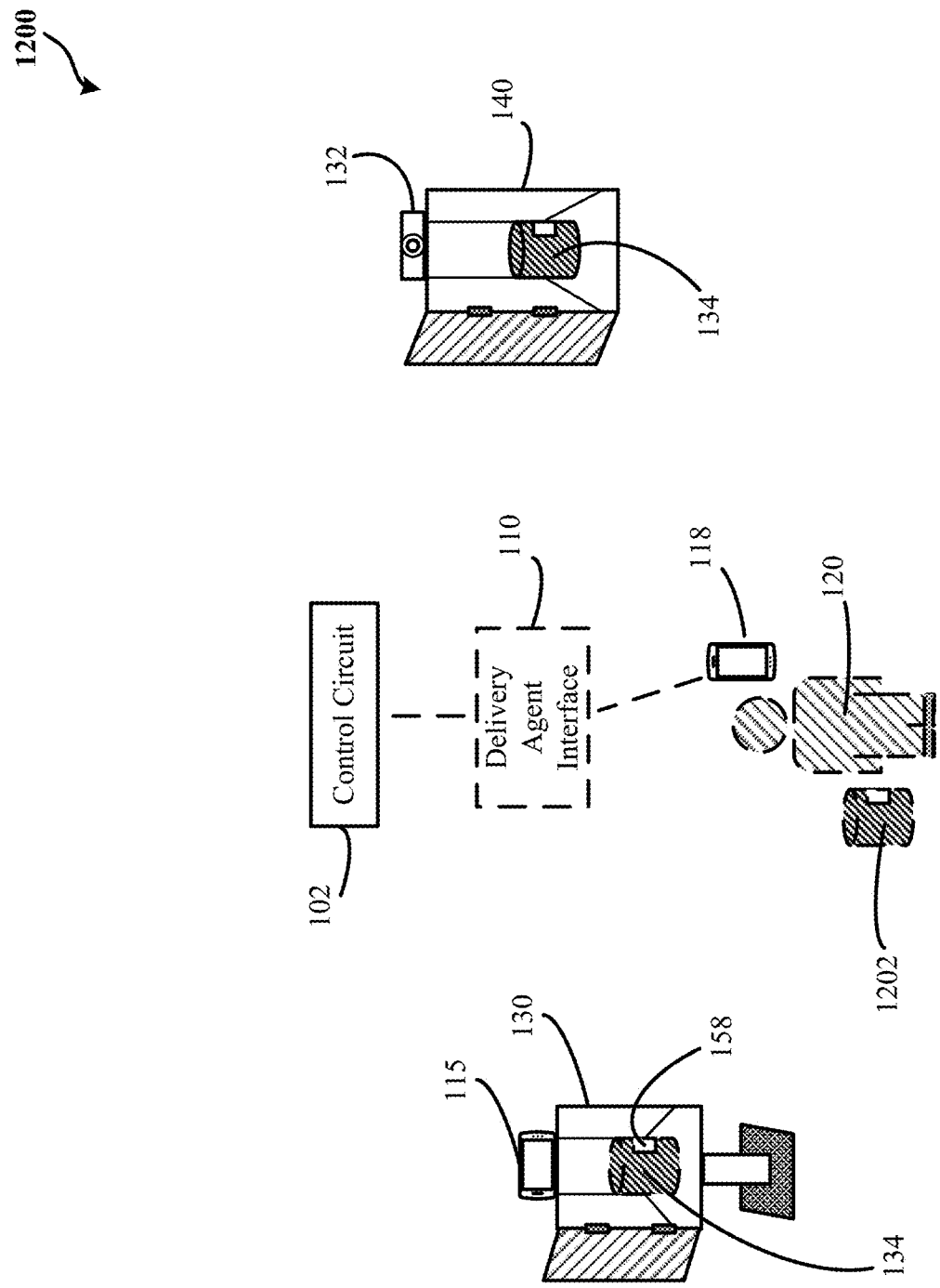
FIG. 12 illustrates a schematic illustration of an exemplary system of delivery packages to customer in accordance with some embodiments.

In another implementation, as shown in FIG. 12, the control circuit 102 may receive sensed data from the second customer electronic device 115, which is associated with the customer drop-site, such as a building front desk, a secured mail box, a mail slot at a home, or a customer garage space. In other configurations, as suggested above, the customer drop-site may correspond to the customer docking station 130 or the docking station 140, which may be stand-alone structures or may be, for example, incorporated into a physical retail shopping facility, a distribution center, a community facility, a post office, and/or the customer's 116 house. Upon receipt of the sensed data from the second customer electronic device 115, the control circuit 102 may authenticate the delivery agent 120 and/or the delivery container 134. The authentication may confirm that the delivery container 134 received by the customer 116 was delivered by the delivery agent 120 responsible for handling the delivery container 134. By one approach, authenticating delivery agents may include receiving and analyzing one or more of authentication aspects described herein. For example, the one or more of authentication aspects may include a delivery code, walking gait detection, biometric authentication, Bluetooth confirmation, GPS-enabled history confirmation of a delivery agent electronic device or usage history of the delivery agent electronic device. In another configuration, the control circuit 102 may determine that a delivery container 1202 may be delivered by the delivery agent 120 directly to the customer 116.

Further, authenticating the delivery container 134 may include comparing the sensed data with associated delivery agent profile and the delivery agent aspects. The associated delivery agent profile and the delivery agent aspects are associated with the delivery agents responsible for handling the delivery container 134 by the control circuit 102. The sensed data may include, for example, a unique delivery container identifier associated with the delivery container 134, a unique retail order identifier associated with the retail order submitted by the customer 116, a unique item identifier associated with the at least one item from the retail order, or any combination thereof.

By one approach, the control circuit 102 may be in communication with the customer drop-site. The control circuit 102 may receive confirmation data of the delivery container 134 being provided to or secured to the customer drop-site. For example, upon receipt of a finger print scan from the customer 116 and verification that the finger print scan matched the database, the control circuit 102 may update the databases to confirm delivery of the delivery container 134. In other configurations, the confirmation data may be provided by the customer drop-site, such as in configurations where the delivery container 134 has the passive sensor 158 therein that is read by sensors or the second customer electronic device 115 at the customer drop-site.

In another configuration, the control circuit 102 may determine whether the delivery container 134 has reached a predetermined distance from the customer drop-site based on the retail order, the package database, and/or the sensed data. The control circuit 102 may provide a delivery code to the customer electronic device 114 in response to the delivery container 134 reaching the predetermined distance. In one configuration, the customer electronic device 114 may send the delivery code back to the control circuit 102 upon a determination by the customer 116 that the unique retail order identifier associated with the delivery container 134 corresponds to the retail order.

In another configuration, the control circuit 102 may include a location positioning system lock. By one approach, a location positioning system used to implement the location positioning system lock may include a Global Positioning System (GPS), a Galileo System, a Global Navigation Satellite System (GLONASS), among other types of one or more systems configured to provide one or more location coordinates. In one example, the control circuit 102 may detect unauthorized removal of at least one of the one or more storage lockers 128, 135, 136, 138 from the docking stations 130, 140, 150, 152 and/or at least one of the docking stations 130, 140, 150, 152 from a predetermined location coordinate or position. In such an example, a docking station and/or a storage locker may be associated with a particular location coordinate or position that is previously determined or stored in a storage system or a memory device coupled to the control circuit 102. By one approach, the particular location coordinate or position may be assigned to the docking station 130, 140, 150, 152 and/or the storage locker 128, 135, 136, 138 at a first time the docking station and/or the storage locker is placed at a docking site. By another approach, the control circuit 102 may associate and/or assign the particular location coordinate or position to the docking station 130, 140, 150, 152 and/or the storage locker 128, 135, 136, 138 as a home location or position based on a location data provided by the location positioning system coupled to the control circuit 102. In one scenario, the home location or position may be determined at a time the docking station and/or the storage locker is installed or associated with a customer or a retail store. In another scenario, the home location or position may be determined when a customer or a retail store associated with the docking station and/or the storage locker initiates association and/or assignment of the home location or position with the docking station and/or the storage locker.

In another configuration, the control circuit 102 may prevent access to the at least one of the one or more storage lockers or the at least one of the docking stations in response to detecting the unauthorized removal of the at least one of the one or more storage lockers 128, 135, 136, 138 and/or the at least one of the docking stations 130, 140, 150, 152. In such a configuration, when the control circuit 102 detects that one of the storage lockers or the docking station is not at the assigned or associated location coordinate, the control circuit 102 may prevent access to the storage locker or the docking station, for example, by not opening and/or unlocking the storage locker or the docking station. By one approach, to detect the unauthorized removal, the control circuit 102 may receive a location data from the location positioning system and compare the received location data with the assigned or associated location coordinate or position. If there is a mismatch, the control circuit 102 may prevent access to the storage locker and/or the docking station. By one approach, the control circuit 102 may periodically receive location data from the location positioning system. By another approach, the control circuit 102 may be coupled to a sensor configured to provide movement, detachment, and/or vibration data of the storage locker and/or the docking station to the control circuit 102. By one approach, based on the data provided by the sensor, the control circuit 102 may detect that the storage locker and/or the docking station had been moved or being moved.

In another configuration, the control circuit 102 may provide an alert message to at least one of a customer or a retail store associated with the one or more storage lockers or the docking stations. By one example, the alert message may include a beacon, an audible alarm, and/or a data communication sent to a device of the customer or a device associated with an associate of the retail store, among other types of triggering a warning to the customer or to the retail store that a storage locker and/or a docking station is being moved and/or has been moved. By one approach, the alert message may indicate the unauthorized removal and/or current location of at least one of the one or more storage lockers and/or at least one of the docking stations.

Figure 2:
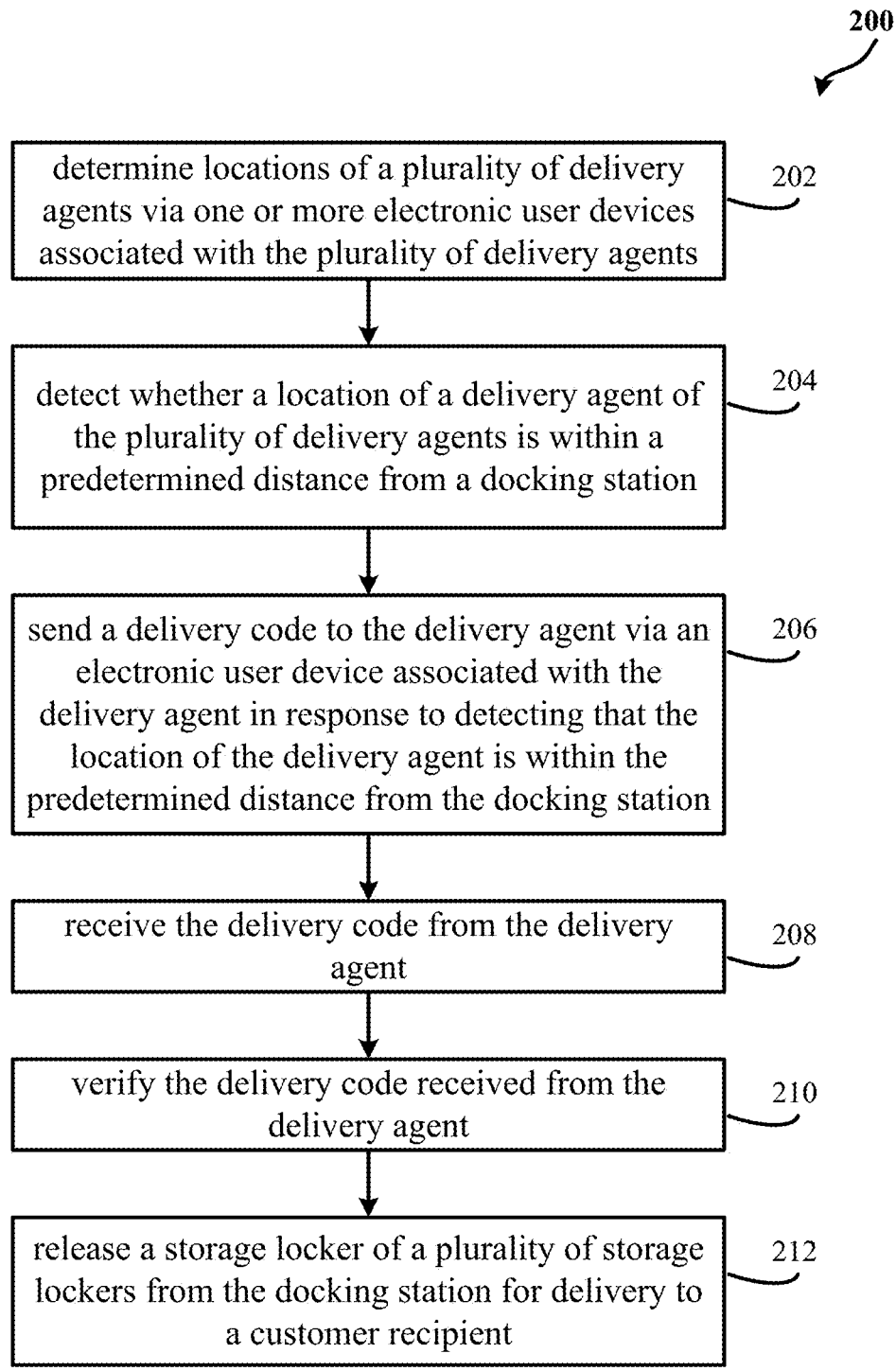
FIG. 2 is an exemplary flow diagram of a method for delivering packages to customers in accordance with some embodiments.

FIG. 2 is an exemplary flow diagram of a method 200 for delivering packages to customers. The method 200 may be implemented in the system 100 of FIG. 1. The method 200 may include determining, by a control circuit, locations of a plurality of delivery agents via one or more delivery agent electronic devices associated with the plurality of delivery agents, at step 202. The one or more delivery agent electronic devices may be carried by the plurality of separate or distinct delivery agents. At step 204, the method 200 may also include detecting whether a location of a delivery agent of the plurality of delivery agents is within a predetermined distance from a docking station. The docking station may have a plurality of storage lockers awaiting delivery.

In response to detecting that the location of the delivery agent is within the predetermined distance from the docking station, sending a delivery code to the delivery agent via a delivery agent electronic device associated with the delivery agent, at step 206. The method 200 may include, at step 208, receiving the delivery code from the delivery agent when the delivery agent is at the docking station. At step 210, the method 200 may include verifying the delivery code received from the delivery agent. At step 212, the method 200 may also include releasing a storage locker of the plurality of storage lockers from the docking station for delivery to a customer recipient.

Figure 3:
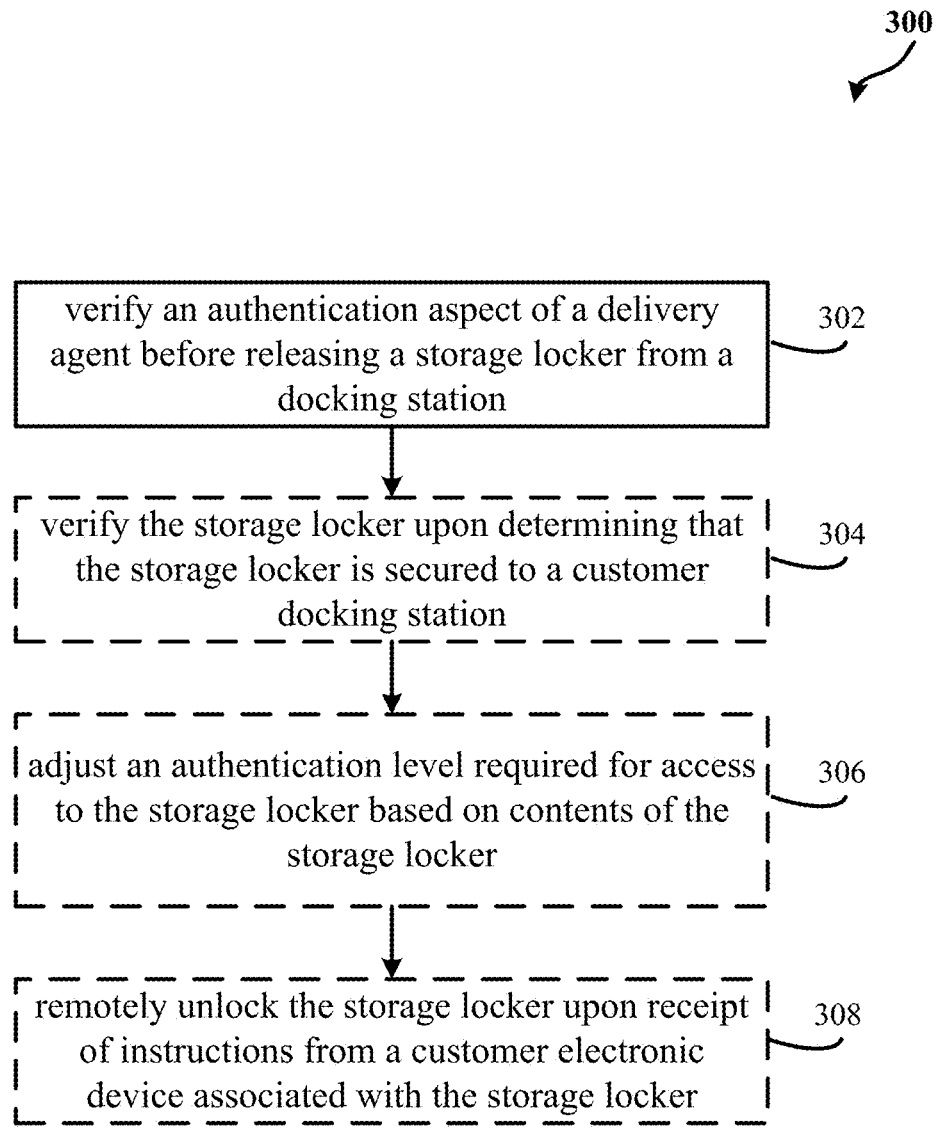
FIG. 3 is an exemplary flow diagram of a method for delivering packages to customers in accordance with some embodiments.

FIG. 3 is an exemplary flow diagram of a method 300 for delivering packages to customers. By one approach, the method 300 may be implemented in the system 100 of FIG. 1. By another approach, the method 300 and/or one or more steps of the method 300 may optionally be included in and/or performed in cooperation with the method 200 of FIG. 2. The method 300 may include, at step 302, verifying an authentication aspect of the delivery agent before releasing the storage locker from the docking station. The authentication aspect may include a delivery code, walking gait detection, biometric authentication, Bluetooth confirmation, GPS-enabled history confirmation of the delivery agent electronic device carried by the delivery agent, and/or usage history of the delivery agent electronic device carried by the delivery agent.

At step 304, the method 300 may include verifying the storage locker upon determining that the storage locker is secured to a customer docking station. The method 300 may also include adjusting an authentication level required for access to the storage locker based on contents of the storage locker, at step 306. At step 308, the method 300 may also include remotely unlocking the storage locker upon receipt of instructions from a customer electronic device associated with the storage locker.

Figure 4:
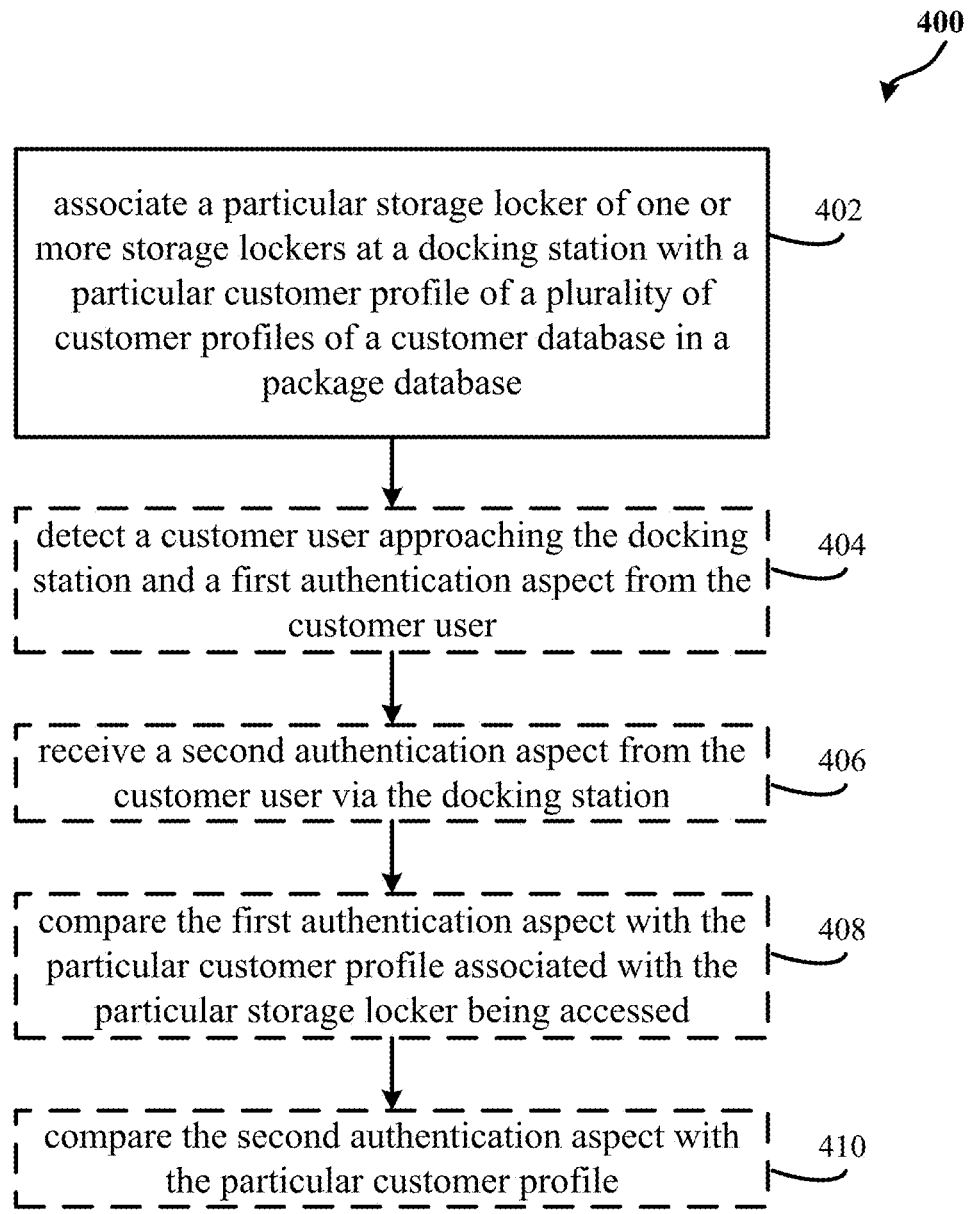
FIG. 4 is an exemplary flow diagram of a method for delivering packages to customers in accordance with some embodiments.

FIG. 4 is an exemplary flow diagram of a method 400 for delivering packages to customers. By one approach, the method 400 may be implemented in the system 100 of FIG. 1. By another approach, the method 400 and/or one or more steps of the method 400 may optionally be included in and/or performed in cooperation with the method 200 of FIG. 2 and/or the method 300 of FIG. 3. The method 400 includes, at step 402, associating a particular storage locker of one or more storage lockers at a docking station with a particular customer profile of a plurality of customer profiles of a customer database via a package database. The customer database is configured to store the plurality of customer profiles, where the plurality of customer profiles may have one or more customer aspects stored therewith. In one configuration, the package database may store relational data corresponding to the plurality of docking stations, associated storage lockers, and contents of the storage lockers.

At step 404, the method 400 may include detecting a customer user approaching the docking station and a first authentication aspect from the customer user. At step 406, the method 400 may also include receiving a second authentication aspect from the customer user via the docking station. The first authentication aspect may be compared with the particular customer profile associated with the particular storage locker being accessed, at step 408. At step 410, the method 400 may also include comparing the second authentication aspect with the particular customer profile. At least one of the first authentication aspect or the second authentication aspect may occur via a customer electronic device carried by the customer user.

Figure 5:
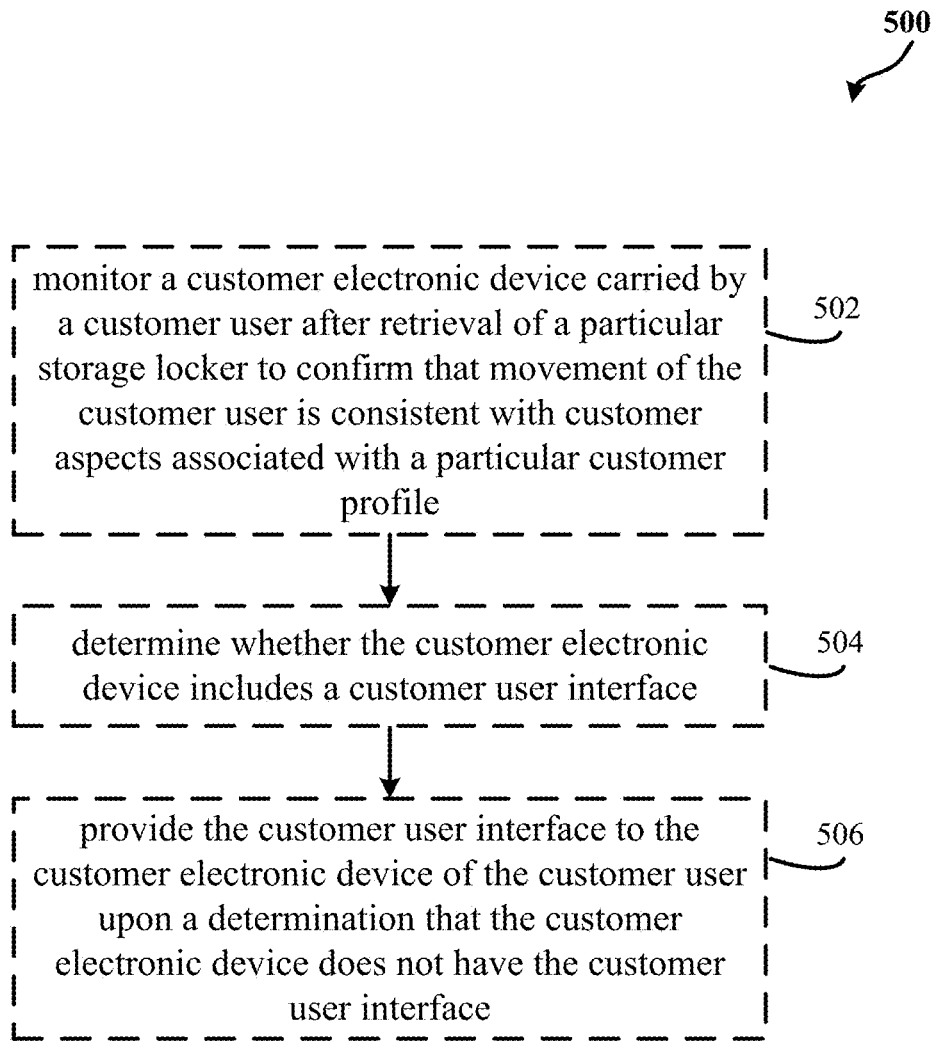
FIG. 5 is an exemplary flow diagram of a method for delivering packages to customers in accordance with some embodiments.

FIG. 5 is an exemplary flow diagram of a method 500 for delivering packages to customers. By one approach, the method 500 may be implemented in the system 100 of FIG. 1. By another approach, the method 500 and/or one or more steps of the method 500 may optionally be included in and/or performed in cooperation with the method 200 of FIG. 2, the method 300 of FIG. 3, and/or the method 400 of FIG. 4. The method 500 includes, at step 502, monitoring the customer electronic device carried by the customer user after retrieval of the particular storage locker to confirm that movement of the customer user is consistent with customer aspects associated with the particular customer profile. At step 504, the method 500 may include determining whether the customer electronic device includes a customer user interface. Upon determining that the customer user interface is included, the customer user interface may be executed by the customer electronic device. Alternatively, upon a determination that the customer electronic device does not have the customer user interface, the customer user interface may be provided to the customer electronic device of the customer user, at step 506.

Figure 6:
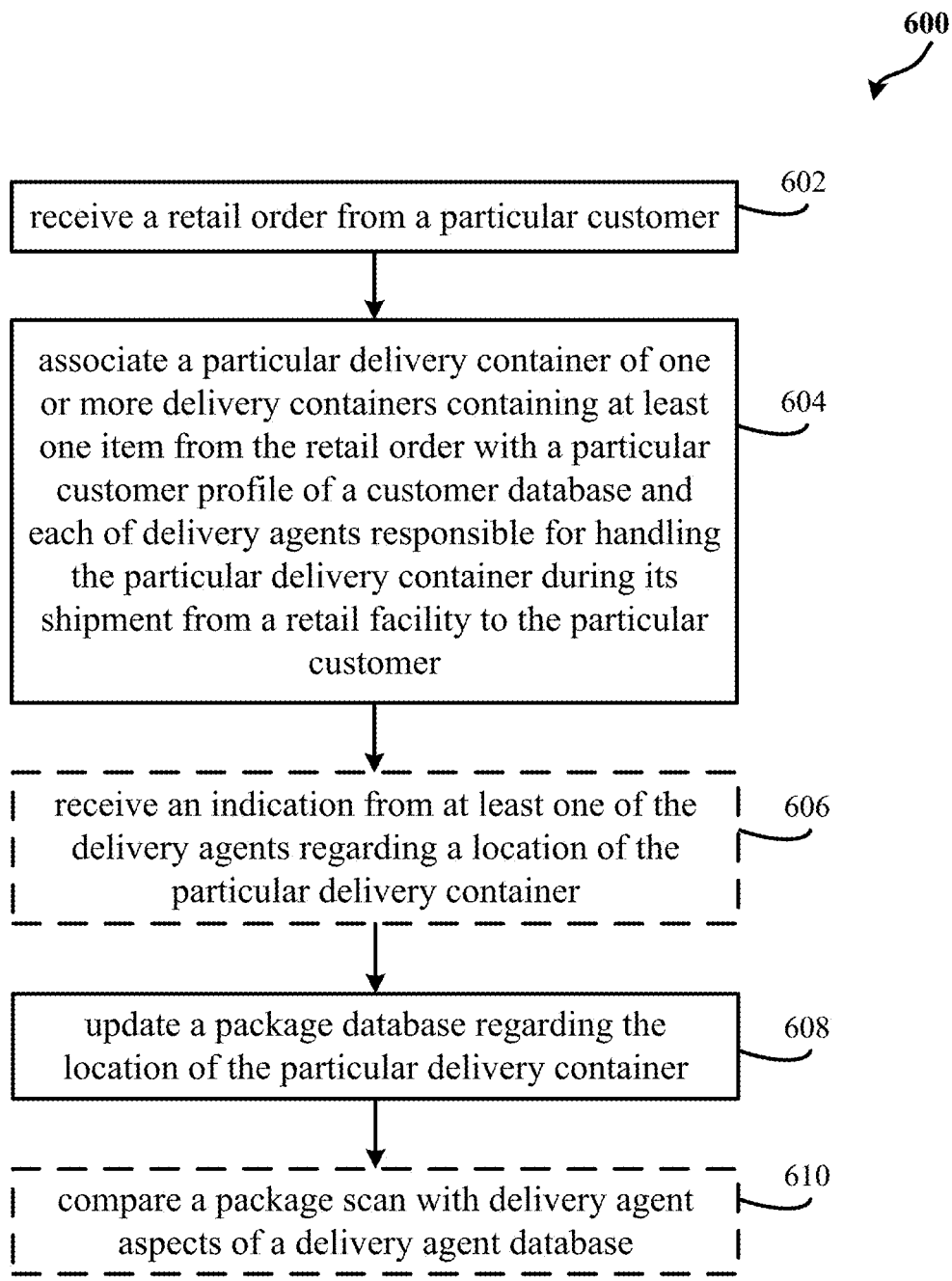
FIG. 6 is an exemplary flow diagram of a method for delivering packages to customers in accordance with some embodiments.

FIG. 6 is an exemplary flow diagram of a method 600 for delivering packages to customers. By one approach, the method 600 may be implemented in the system 100 of FIG. 1. By another approach, the method 600 and/or one or more steps of the method 600 may optionally be included in and/or performed in cooperation with the method 200 of FIG. 2, the method 300 of FIG. 3, the method 400 of FIG. 4, and/or the method 500 of FIG. 5. The method 600 includes, at step 602, receiving a retail order from a particular customer. At step 604, the method 600 may include associating a particular delivery container of one or more delivery containers containing at least one item from the retail order with a particular customer profile of a customer database and each of delivery agents responsible for handling the particular delivery container during its shipment from a retail facility to the particular customer. An indication from at least one of the delivery agents regarding a location of the particular delivery container may be received, at step 606.

At step 608, the method 600 may include updating a package database regarding the location of the particular delivery container. The package database may include the one or more delivery containers and associated delivery agents responsible for handling the one or more delivery containers. A package scan may be compared with delivery agent aspects of a delivery agent database, at step 610. The delivery agent aspects may be associated with each of the delivery agents responsible for handling the particular delivery container upon receipt of the package scan from a customer electronic device associated with the particular customer via a customer user interface.

Figure 7:
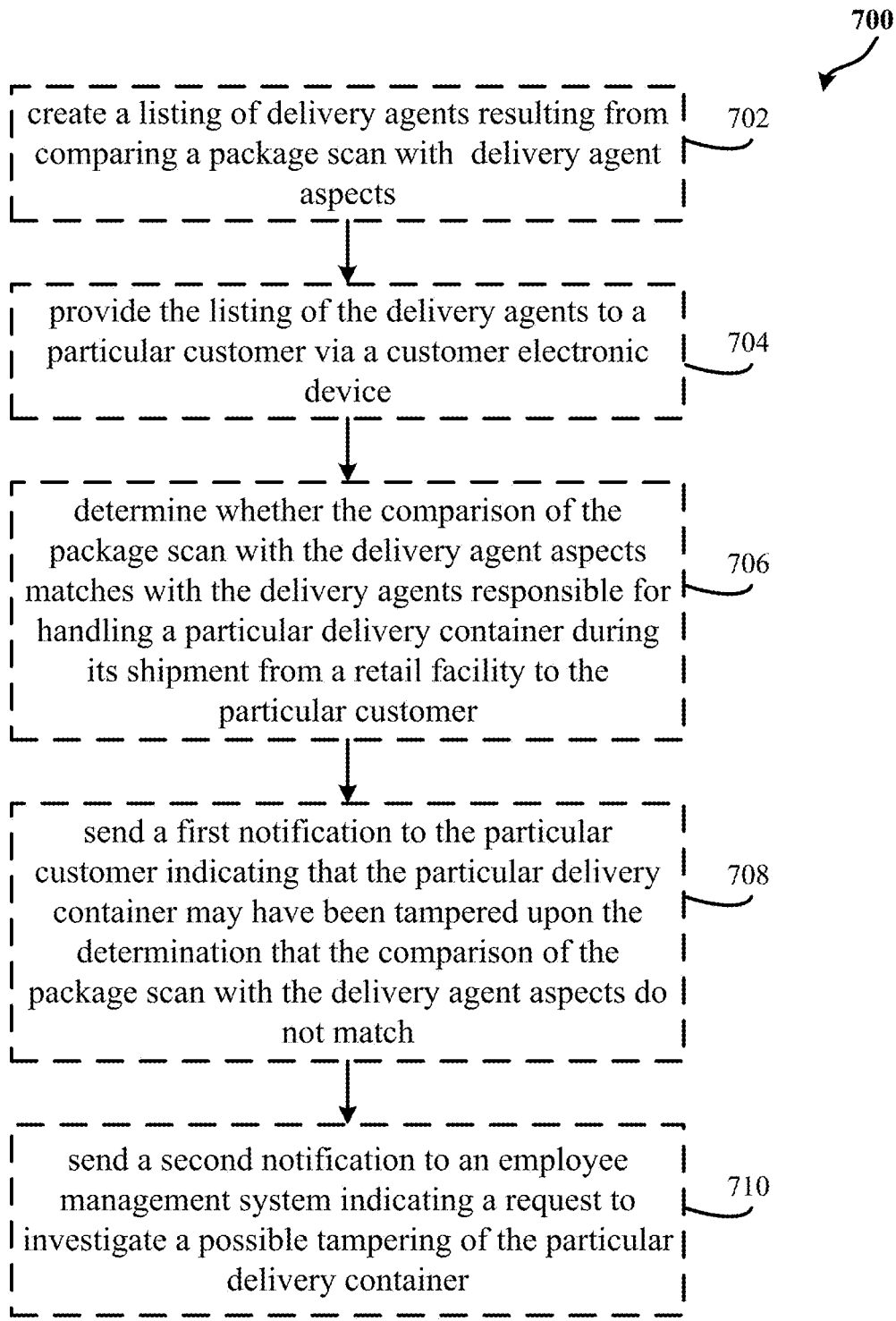
FIG. 7 is an exemplary flow diagram of a method for delivering packages to customers in accordance with some embodiments.

FIG. 7 is an exemplary flow diagram of a method 700 for delivering packages to customers. By one approach, the method 700 may be implemented in the system 100 of FIG. 1. By another approach, the method 700 and/or one or more steps of the method 700 may optionally be included in and/or performed in cooperation with the method 200 of FIG. 2, the method 300 of FIG. 3, the method 400 of FIG. 4, the method 500 of FIG. 5, and/or the method 600 of FIG. 6. The method 700 includes, at step 702, creating a listing of delivery agents resulting from comparing the package scan with the delivery agent aspects. The method 700 may include, at step 704, providing the listing of delivery agents to the particular customer via the customer electronic device. At step 706, the method 700 may include determining whether the comparison of the package scan with the delivery agent aspects matches with the delivery agents responsible for handling the particular delivery container during its shipment from the retail facility to the particular customer. Upon the determination that the comparison of the package scan with the delivery agent aspects do not match, sending a first notification to the particular customer indicating that the particular delivery container may have been tampered with, at step 708. At step 710, the method 700 may also include sending a second notification to an employee management system indicating a request to investigate a possible tampering of the particular delivery container.

Figure 8:
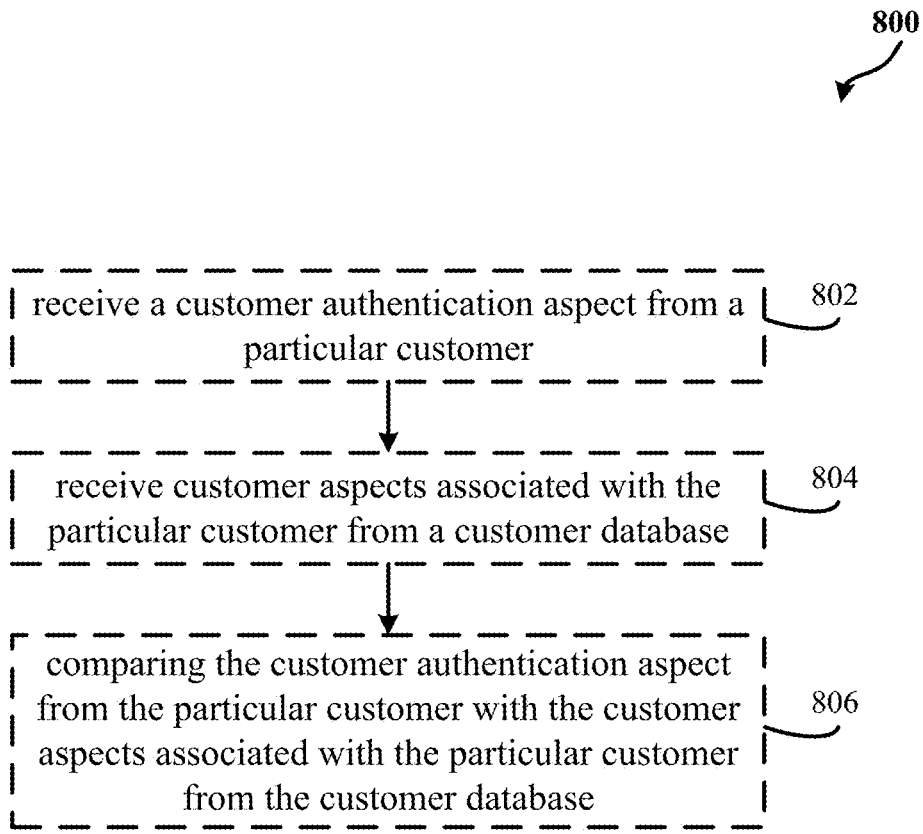
FIG. 8 is an exemplary flow diagram of a method for delivering packages to customers in accordance with some embodiments.

FIG. 8 is an exemplary flow diagram of a method 800 for delivering packages to customers. By one approach, the method 800 may be implemented in the system 100 of FIG. 1. By another approach, the method 800 and/or one or more steps of the method 800 may optionally be included in and/or performed in cooperation with the method 200 of FIG. 2, the method 300 of FIG. 3, the method 400 of FIG. 4, the method 500 of FIG. 5, the method 600 of FIG. 6, and/or the method 700 of FIG. 7. The method 800 includes, at step 802, receiving a customer authentication aspect from the particular customer. At step 804, the method 800 may include receiving customer aspects associated with the particular customer from a customer database. The customer database may store customer aspects associated with each of the plurality of customers. The customer authentication aspect from the particular customer may be compared with the customer aspects associated with the particular customer from the customer database, at step 806.

Figure 9:
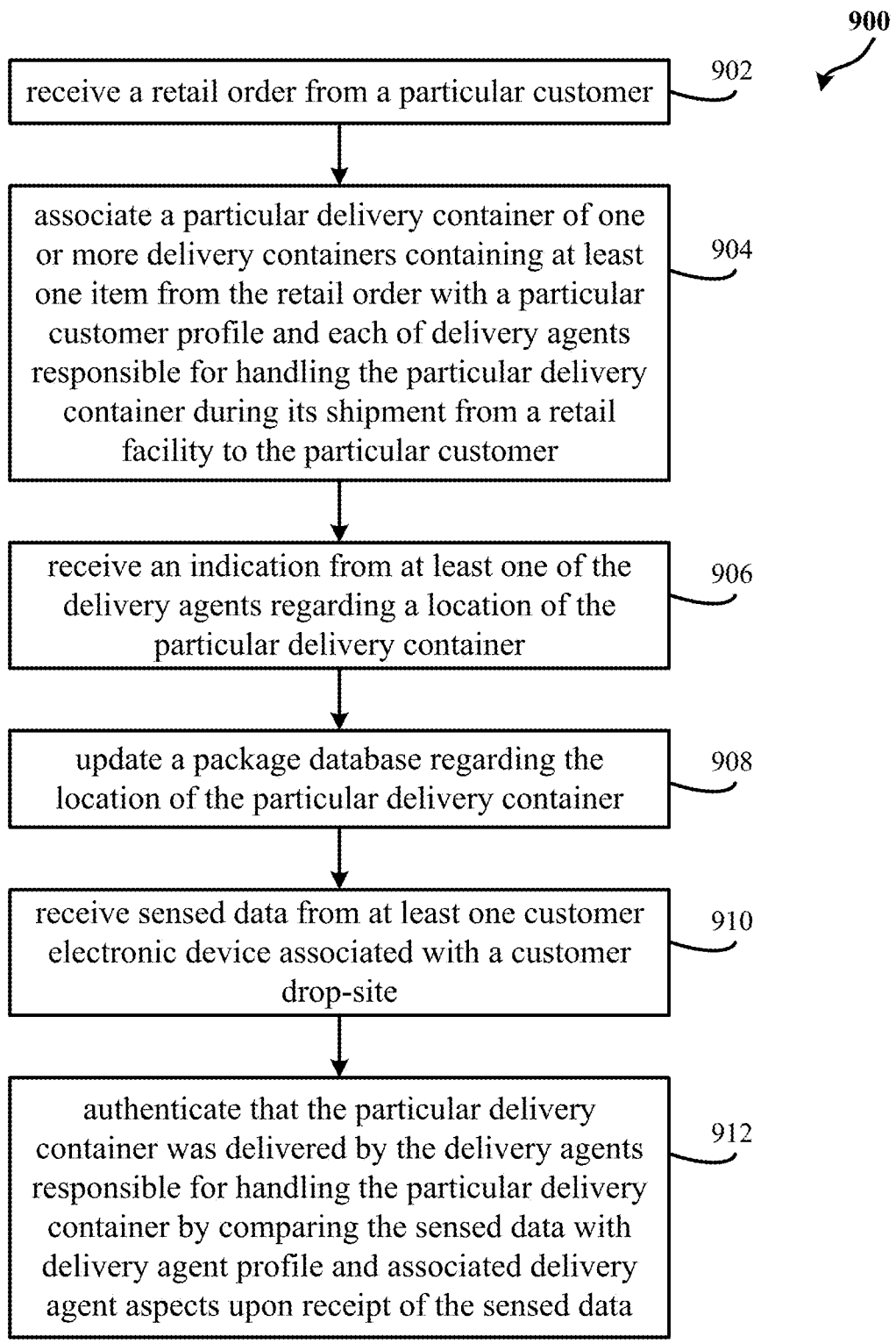
FIG. 9 is an exemplary flow diagram of a method for delivering packages to customers in accordance with some embodiments.

FIG. 9 is an exemplary flow diagram of a method 900 for delivering packages to customers. By one approach, the method 900 may be implemented in the system 100 of FIG. 1. By another approach, the method 900 and/or one or more steps of the method 900 may optionally be included in and/or performed in cooperation with the method 200 of FIG. 2, the method 300 of FIG. 3, the method 400 of FIG. 4, the method 500 of FIG. 5, the method 600 of FIG. 6, the method 700 of FIG. 7, and/or the method 800 of FIG. 8. The method 900 includes, at step 902, receiving a retail order from a particular customer. The method 900 may include, at step 904, associating a particular delivery container of one or more delivery containers containing at least one item from the retail order with a particular customer profile and each of delivery agents responsible for handling the particular delivery container during its shipment from a retail facility to the particular customer. At step 906, the method 900 may also include receiving an indication from at least one of the delivery agents regarding a location of the particular delivery container.

At step 908, the method 900 may also updating a package database regarding the location of the particular delivery container. Sensed data from the at least one customer electronic device associated with the customer drop-site may be received, at step 910. Upon receipt of the sensed data, authenticating that the particular delivery container was delivered by the delivery agents responsible for handling the particular delivery container received by the particular customer by comparing the sensed data with delivery agent profile and associated delivery agent aspects, at step 912. The delivery agent profile and the associated delivery agent aspects may be associated with the delivery agents responsible for handling the particular delivery container. The package database may include relational data corresponding to the one or more delivery containers and delivery agents responsible for handling the one or more delivery containers.

Figure 10:
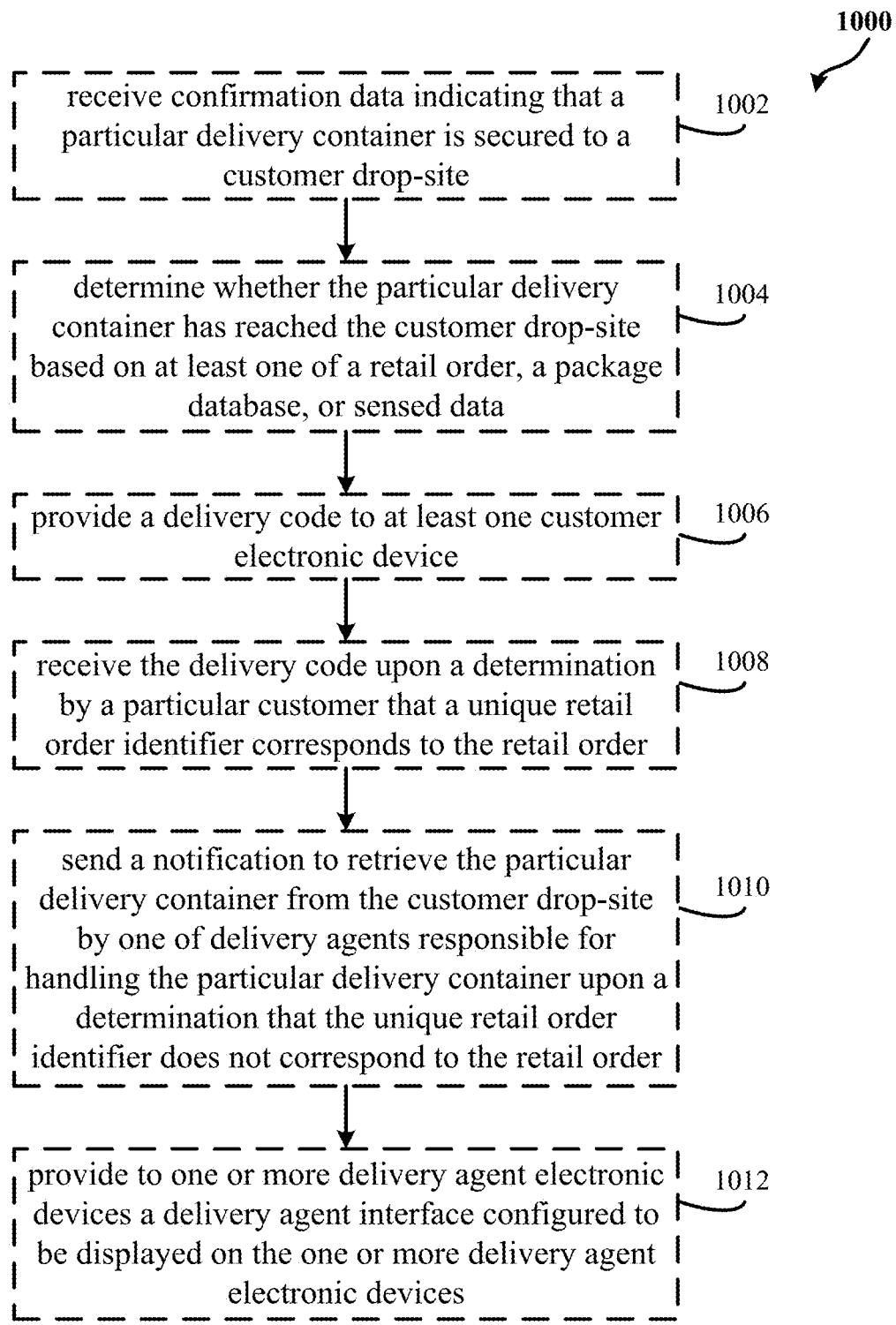
FIG. 10 is an exemplary flow diagram of a method for delivering packages to customers in accordance with some embodiments.

FIG. 10 is an exemplary flow diagram of a method 1000 for delivering packages to customers. By one approach, the method 1000 may be implemented in the system 100 of FIG. 1. By another approach, the method 1000 and/or one or more steps of the method 1000 may optionally be included in and/or performed in cooperation with the method 200 of FIG. 2, the method 300 of FIG. 3, the method 400 of FIG. 4, the method 500 of FIG. 5, the method 600 of FIG. 6, the method 700 of FIG. 7, the method 800 of FIG. 8, and/or the method 900 of FIG. 9. The method 1000 includes, at step 1002, receiving confirmation data indicating that the particular delivery container is secured to the customer drop-site. The control circuit may be in communication with the customer drop-site. At step 1004, the method 1000 may include determining whether the particular delivery container has reached the customer drop-site based on at least one of the retail order, the package database, and/or the sensed data. Furthermore, the determination of whether the particular delivery container has reached the customer drop-site may also be based on the deliver agent electronic device(s) 118, 146 and/or the customer electronic device(s) 114, 148. At step 1006, the method 1000 may include providing a delivery code to the at least one customer electronic device. At step 1008, the method 1000 may include receiving the delivery code upon a determination by the particular customer that a unique retail order identifier corresponds to the retail order. At step 1010, the method 1000 may include sending a notification to retrieve the particular delivery container from the customer drop-site by one of the delivery agents responsible for handling the particular delivery container upon a determination that the unique retail order identifier does not correspond to the retail order. The notification may be sent to the one or more delivery agent electronic devices. At step 1012, the method 1000 may include providing to the one or more delivery agent electronic devices a delivery agent interface configured to be displayed on the one or more delivery agent electronic devices. The delivery agent interface may display the notification.

Figure 11:
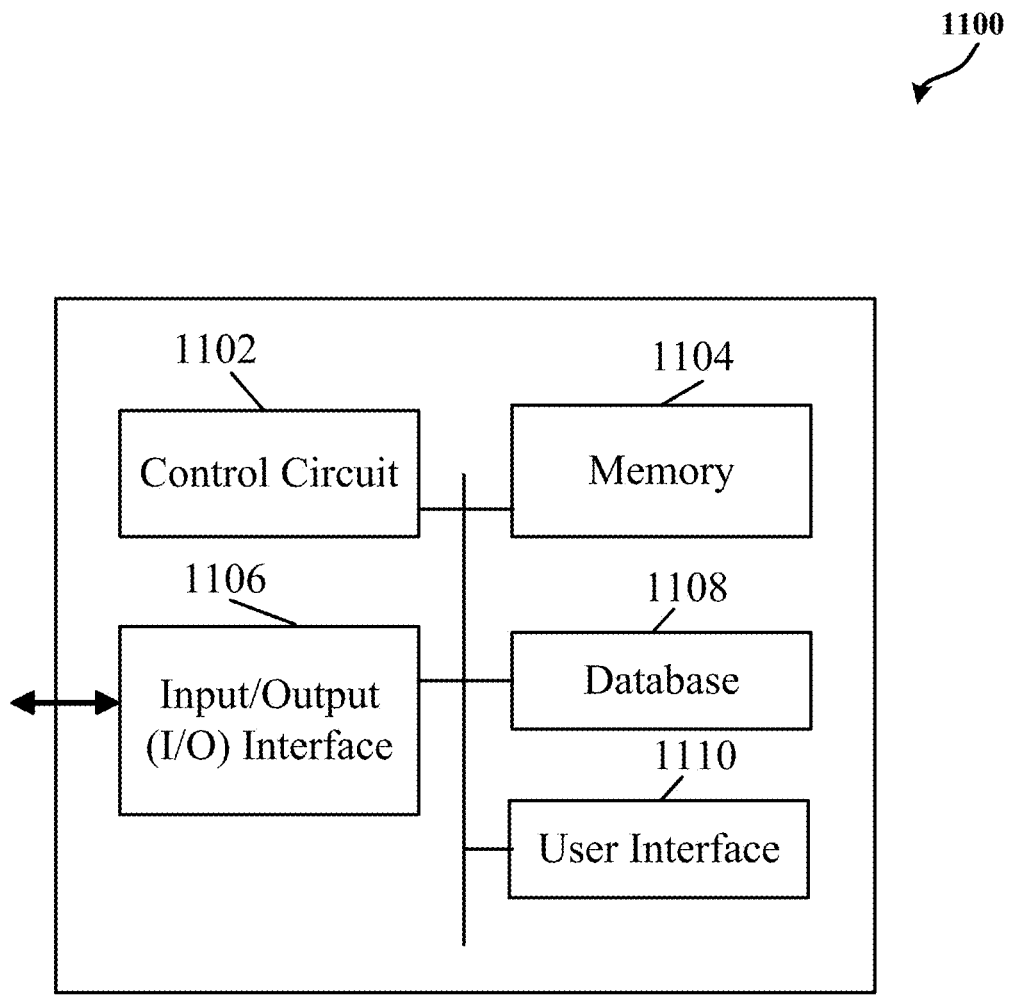
FIG. 11 illustrates an exemplary system for use in implementing systems, apparatuses, devices, methods, techniques, and the like in delivering packages to customers in accordance with several embodiments.

The methods, techniques, systems, devices, services, servers, sources and the like described herein may be utilized, implemented and/or run on many different types of devices and/or systems. Referring to FIG. 11, there is illustrated a system 1100 that may be used for any such implementations, in accordance with some embodiments. One or more components of the system 1100 may be used to implement any system, apparatus or device mentioned above, or parts of such systems, apparatuses or devices, such as for example any of the above or below mentioned control circuits, customer and/or delivery agent electronic devices, databases, customer user and/or delivery agent interfaces, parts thereof, and the like. However, the use of the system 1100 or any portion thereof is certainly not required.

By way of example, the system 1100 may include one or more control circuits 1102, memory 1104, one or more database 1108, input/output (I/O) interfaces 1106, and user interface 1110. The control circuit 1102 typically comprises one or more processors and/or microprocessors. The memory 1104 stores the operational code or set of instructions that is executed by the control circuit 1102 and/or processor to implement the functionality of the systems and devices described herein, parts thereof, and the like. In some embodiments, the memory 1104 may also store some or all of particular data that may be needed to deliver packages to customer.

It is understood that the control circuit 1102 and/or processor may be implemented as one or more processor devices as are well known in the art. Similarly, the memory 1104 may be implemented as one or more memory devices as are well known in the art, such as one or more processor readable and/or computer readable media and can include volatile and/or nonvolatile media, such as RAM, ROM, EEPROM, flash memory and/or other memory technology.

Further, the memory 1104 is shown as internal to the system 1100; however, the memory 1104 can be internal, external or a combination of internal and external memory. The memory 1104 may also be referred to as storage devices. Additionally, the system typically includes a power supply (not shown), which may be rechargeable, and/or it may receive power from an external source. While FIG. 11 illustrates the various components being coupled together via a bus, it is understood that the various components may actually be coupled to the control circuit 1102 and/or one or more other components directly.

Generally, the control circuit 1102 and/or electronic components of the system 1100 can comprise fixed-purpose hard-wired platforms or can comprise a partially or wholly programmable platform. These architectural options are well known and understood in the art and require no further description here. The system and/or control circuit 1102 can be configured (for example, by using corresponding programming as will be well understood by those skilled in the art) to carry out one or more of the steps, actions, and/or functions described herein. In some implementations, the control circuit 1102 and the memory 1104 may be integrated together, such as in a microcontroller, application specification integrated circuit, field programmable gate array or other such device, or may be separate devices coupled together.

The I/O interface 1106 allows wired and/or wireless communication coupling of the system 1100 to external components and/or or systems. Typically, the I/O interface 1106 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 1110 may be used for user input and/or output display, such as the docking station interface or the customer docking station interface. For example, the user interface 1110 may include any known input devices, such one or more buttons, knobs, selectors, switches, keys, touch input surfaces, audio input, and/or displays, etc. Additionally, the user interface 1110 include one or more output display devices, such as lights, visual indicators, display screens, etc. to convey information to a user, such as but not limited to communication information, status information, notifications, errors, conditions, and/or other such information. Similarly, the user interface 1110 in some embodiments may include audio systems that can receive audio commands or requests verbally issued by a user, and/or output audio content, alerts and the like.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A package delivery system using crowd-sourced delivery agents to deliver packages to customers, the system comprising:
    one or more delivery agent electronic devices configured to be carried by separate and distinct delivery agents;
    one or more storage lockers at docking stations, the one or more storage lockers configured to retain one or more delivery containers;
    a package database storing relational data corresponding to the docking stations, the one or more storage lockers associated with the docking stations, and the one or more delivery containers associated with the one or more storage lockers;
    and a control circuit in communication with the one or more delivery agent electronic devices and the docking stations, the control circuit configured to:
    access the package database;
    associate a particular storage locker of the one or more storage lockers with a delivery code generated by a customer recipient upon a submission of a product order by the customer recipient, wherein the delivery code is used in authenticating a release of the particular storage locker from a corresponding docking station of the docking stations to a delivery agent of the delivery agents, and wherein the particular storage locker has a delivery container associated with the product order;
    determine locations of the delivery agents via the one or more delivery agent electronic devices;
    detect whether a location of the delivery agent is within a predetermined distance from a docking station of the docking stations having a number of storage lockers of the one or more storage lockers awaiting delivery;
    in response to the detection that the location is within the predetermined distance from the docking station, send the delivery code to the delivery agent via a delivery agent electronic device of the one or more delivery agent electronic devices associated with the delivery agent;
    receive, at the docking station, the delivery code from the delivery agent;
    verify the delivery code received from the delivery agent;
    and release the particular storage locker from the docking station for delivery of the particular storage locker to the customer recipient when the delivery code received from the delivery agent is verified with the delivery code sent to the delivery agent by the control circuit.

2. The package delivery system of claim 1, wherein the control circuit is further configured to verify an authentication aspect of the delivery agent before unlocking the particular storage locker from the docking station, the authentication aspect including at least one of: a delivery code, walking gait detection, biometric authentication, Bluetooth confirmation, GPS-enabled history confirmation of the delivery agent electronic device carried by the delivery agent, or usage history of the delivery agent electronic device carried by the delivery agent.

3. The package delivery system of claim 1, further comprising a delivery agent database comprising a plurality of delivery agents and corresponding delivery agent profiles, wherein a particular delivery agent profile of the delivery agent profiles comprises at least one storage locker of the one or more storage lockers assigned to a particular delivery agent of the plurality of delivery agents, a particular delivery route of a plurality of delivery routes, a particular docking station of the docking stations, or any combination thereof.

4. The package delivery system of claim 1, further comprising a delivery agent interface configured to be displayed on the delivery agent electronic device of the delivery agent, wherein the delivery agent interface is at least one of: provided to the delivery agent electronic device by the control circuit or configured to be executed by the delivery agent electronic device when in communication with the control circuit.

5. The package delivery system of claim 1, wherein the docking stations are incorporated into at least one of: a physical retail shopping facility, a distribution center, a community facility, or a post office.

6. The package delivery system of claim 1, wherein the delivery code is provided to the delivery agent electronic device via a text message and is received from the delivery agent via a docking station interface at the docking station to assist with authentication of the delivery agent.

7. The package delivery system of claim 1, wherein the delivery code is delivered to the delivery agent electronic device and received from the delivery agent via a microphone at a docking station interface at the docking station to assist with authentication of the delivery agent.

8. The package delivery system of claim 1, further comprising a customer docking station associated with the customer recipient, wherein the particular storage locker is secured to the customer docking station upon verification with the control circuit.

9. The package delivery system of claim 8, wherein the control circuit is further configured to adjust an authentication level required for access to the customer docking station depending on contents of the particular storage locker at the customer docking station.

10. The package delivery system of claim 1, further comprising a customer electronic device in communication with the control circuit, wherein the control circuit is further configured to remotely unlock the particular storage locker upon receipt of instructions from the customer electronic device associated with the particular storage locker.

11. The package delivery system of claim 1, wherein, upon receipt of the particular storage locker by the customer recipient, the control circuit is further configured to require customer authentication prior to opening the particular storage locker.

12. The package delivery system of claim 11, wherein the customer authentication may include at least one of: input of a customer code via an electronic user interface associated with the particular storage locker, walking gait detection, biometric authentication, Bluetooth confirmation, GPS-enabled history confirmation, or usage history of an electronic customer device carried by the customer recipient.

13. The package delivery system of claim 1, wherein the control circuit is further configured to automatically detect the delivery agent approaching the docking station and an authentication aspect from the delivery agent, wherein the authentication aspect includes at least one of: a delivery code, walking gait detection, biometric authentication, Bluetooth confirmation, GPS-enabled history confirmation of the delivery agent electronic device carried by the delivery agent, or usage history of the delivery agent electronic device carried by the delivery agent.

14. The package delivery system of claim 1, wherein the control circuit is further configured to track the delivery agents; and determine distances of each of the delivery agents from each of the docking stations having the one or more storage lockers awaiting delivery.

15. The package delivery system of claim 1, wherein the docking station further comprises one or more sensors configured to detect at least one of movement, sound, or electromagnetic signals.

16. The package delivery system of claim 1, wherein the control circuit is further configured to:

detect unauthorized removal of at least one of the one or more storage lockers or at least one of the docking stations from a predetermined location coordinate of the one or more storage lockers or the docking stations;

in response to the detection of the unauthorized removal, prevent access to the at least one of the one or more storage lockers or the at least one of the docking stations;

and provide an alert message to at least one of the customer recipient or a retail store associated with the one or more storage lockers or the docking stations, wherein the alert message indicates at least one of: the unauthorized removal and current location of the at least one of the one or more storage lockers or the at least one of the docking stations.

17. A method for delivering packages to customers using crowd-sourced delivery agents comprising:

receiving, by a control circuit, a product order submitted by a customer recipient, wherein a delivery code is generated by the customer recipient upon a submission of the product order, wherein the delivery code is used in authenticating a release of a storage locker of a plurality of storage lockers from a docking station to a delivery agent of a plurality of delivery agents, and wherein the storage locker has a delivery container associated with the product order;

associating the storage locker with the delivery code;

determining, by the control circuit, locations of the plurality of delivery agents via one or more delivery agent electronic devices associated with the plurality of delivery agents, wherein the one or more delivery agent electronic devices are configured to be carried separately and distinctly by the plurality of delivery agents;

detecting that a location of the delivery agent is within a predetermined distance from the docking station of a plurality of docking stations, wherein the docking station has the plurality of storage lockers awaiting delivery;

in response to detecting that the location of the delivery agent is within the predetermined distance from the docking station, sending the delivery code to the delivery agent via a delivery agent electronic device associated with the delivery agent;

receiving the delivery code from the delivery agent, wherein the delivery agent is at the docking station;

verifying the delivery code received from the delivery agent;

and releasing the storage locker from the docking station for delivery to the customer recipient when the delivery code received from the delivery agent is verified with the delivery code sent to the delivery agent.

18. The method of claim 17, further comprising verifying an authentication aspect of the delivery agent before unlocking the storage locker from the docking station, the authentication aspect including at least one of: a delivery code, walking gait detection, biometric authentication, Bluetooth confirmation, GPS-enabled history confirmation of the delivery agent electronic device carried by the delivery agent, or usage history of the delivery agent electronic device carried by the delivery agent.

19. The method of claim 17, further comprising verifying the storage locker upon determining that the storage locker is secured to a customer docking station.

20. The method of claim 19, further comprising adjusting an authentication level required for access to the storage locker based on contents of the storage locker.

21. The method of claim 17, further comprising remotely unlocking the storage locker upon receipt of instructions from a customer electronic device associated with the storage locker.

22. The method of claim 17, further comprising:
- detecting unauthorized removal of at least one of the one or more storage lockers or at least one of the docking stations from a predetermined location coordinate of the one or more storage lockers or the docking stations;
- in response to the detecting of the unauthorized removal, preventing access to the at least one of the one or more storage lockers or the at least one of the docking stations;
- and providing an alert message to at least one of the customer recipient or a retail store associated with the one or more storage lockers or the docking stations, wherein the alert message indicates at least one of: the unauthorized removal and current location of the at least one of the one or more storage lockers or the at least one of the docking stations.

* * * * *